(12) United States Patent
Yasui et al.

(10) Patent No.: US 6,668,214 B2
(45) Date of Patent: Dec. 23, 2003

(54) CONTROL SYSTEM FOR THROTTLE VALVE ACTUATING DEVICE

(75) Inventors: Yuji Yasui, Wako (JP); Yoshihisa Iwaki, Wako (JP); Jun Takahashi, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/150,354

(22) Filed: May 16, 2002

(65) Prior Publication Data

US 2003/0028262 A1 Feb. 6, 2003

Related U.S. Application Data

(62) Division of application No. 10/043,625, filed on Jan. 10, 2002, now abandoned.

(30) Foreign Application Priority Data

Apr. 20, 2001 (JP) ........................... 2001-123344
May 16, 2001 (JP) ........................... 2001-146145

(51) Int. Cl.$^7$ .............................................. G05D 11/00
(52) U.S. Cl. ......................... 700/282; 700/31; 700/44; 123/674; 60/276
(58) Field of Search ............................ 700/28, 32, 103, 700/29, 30, 31, 72, 282, 44, 45; 123/674, 399; 60/276

(56) References Cited

U.S. PATENT DOCUMENTS

| | | | | | |
|---|---|---|---|---|---|
| 5,083,480 | A | * | 1/1992 | Abo et al. .................... | 477/121 |
| 5,168,954 | A | * | 12/1992 | Nakaniwa et al. .......... | 180/197 |
| 5,200,898 | A | * | 4/1993 | Yuhara et al. ............... | 123/361 |
| 5,339,681 | A | * | 8/1994 | Sekozawa et al. .......... | 73/118.2 |
| 5,529,043 | A | * | 6/1996 | Nagaishi et al. ............ | 123/478 |
| 5,852,930 | A | * | 12/1998 | Yasui et al. ................... | 60/276 |
| 6,014,955 | A | * | 1/2000 | Hosotani et al. ............ | 123/399 |
| 6,293,249 | B1 | * | 9/2001 | Kuretake ..................... | 123/399 |
| 6,367,449 | B1 | * | 4/2002 | Moteki et al. ............... | 123/399 |
| 6,494,181 | B2 | * | 12/2002 | Kuretake ..................... | 123/399 |
| 6,497,214 | B2 | * | 12/2002 | Yagi ............................ | 123/399 |
| 6,502,548 | B2 | * | 1/2003 | Kuretake ..................... | 123/399 |

FOREIGN PATENT DOCUMENTS

| EP | 0 979 934 A2 | * | 2/2000 | ........... F02D/11/10 |
|---|---|---|---|---|
| JP | 8-261050 | | 10/1996 | |

* cited by examiner

*Primary Examiner*—Ramesh Patel
*Assistant Examiner*—Edward F. Gain
(74) *Attorney, Agent, or Firm*—Lahive & Cockfield LLP

(57) ABSTRACT

A control system for a throttle valve actuating device is disclosed. The throttle valve actuating device includes a throttle valve of an internal combustion engine and an actuator for actuating the throttle valve. The control system includes a predictor for predicting a future throttle valve opening and controls the throttle actuating device according to the throttle valve opening predicted by the predictor so that the throttle valve opening coincides with a target opening.

12 Claims, 22 Drawing Sheets

FIG. 1
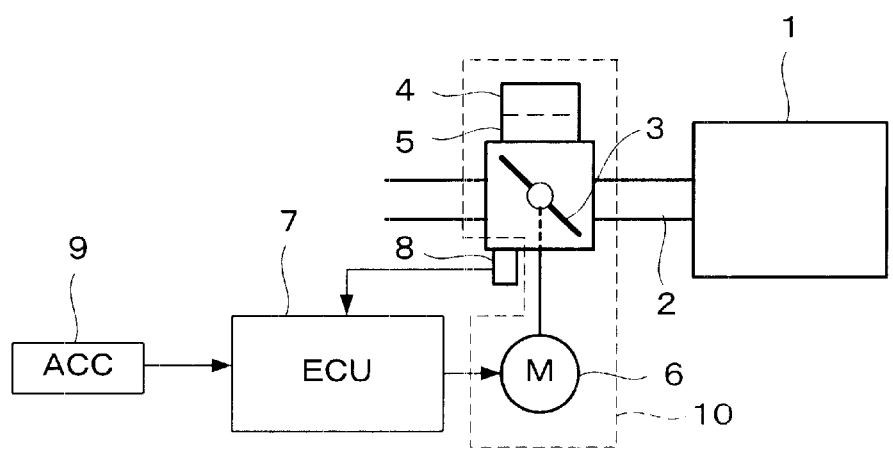
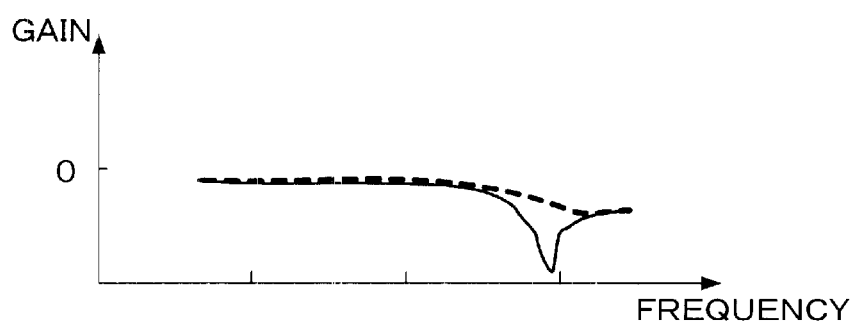
FIG. 2A
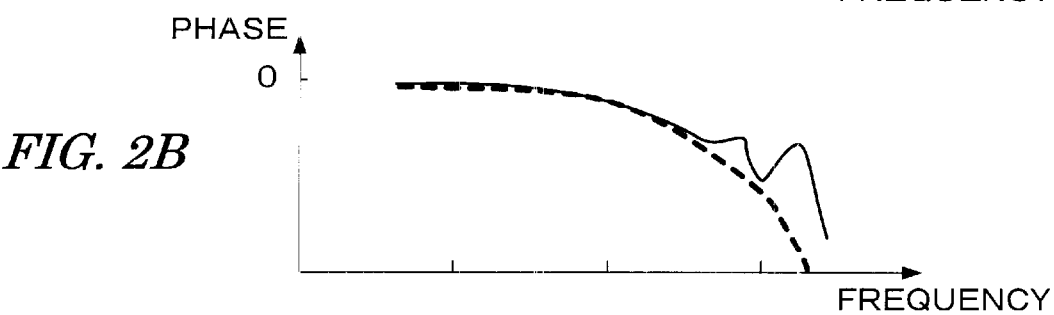
FIG. 2B

CONTROL SYSTEM FOR THROTTLE VALVE ACTUATING DEVICE

RELATED APPLICATIONS

This application is a divisional of U.S. patent application Ser. No. 10/043,625, filed on Jan. 10, 2002, and entitled "CONTROL SYSTEM FOR PLANT" now abandoned.

BACKGROUND OF THE INVENTION

The present invention relates to a control system for a throttle valve actuating device including a throttle valve of an internal combustion engine and an actuator for actuating the throttle valve.

One known control system for controlling a throttle valve actuating device including a motor for actuating the throttle valve and springs for energizing the throttle valve is disclosed in Japanese Patent Laid-open No. Hei 8-261050. In this control system, the throttle valve actuating device is controlled with a PID (Proportional, Integral, and Differential) control according to a throttle valve opening detected by a throttle valve opening sensor.

Since the throttle valve actuating device includes a dead time element which delays the throttle valve movement, the PID control by the above-described conventional control system may easily become unstable if the control gain of the PID control according to the detected throttle valve opening is set to a large value. Therefore, it is necessary to set the control gain to a value which is sufficiently small so that the control may not become unstable. However, this results in a low response speed.

SUMMARY OF THE INVENTION

It is therefore an object of the present invention to provide a control system for a throttle valve actuating device, which can improve the response speed by expanding the stability margin of the control.

To achieve the above object, the present invention provides a control system for a throttle valve actuating device (10) including a throttle valve (3) of an internal combustion engine and actuating means (6) for actuating the throttle valve (3). The control system includes predicting means (23) for predicting a future throttle valve opening (PREDTH) and controls the throttle actuating device (10) according to the throttle valve opening (PREDTH) predicted by the predicting means (23) so that the throttle valve opening (TH) coincides with a target opening (THR).

With this configuration, the throttle actuating device is controlled according to the future throttle valve opening predicted by the predicting means. Accordingly, the stability margin of the control can be expanded although the throttle valve actuating device includes a dead time element. As a result, the control gain can be set to a larger value to thereby improve the control response speed.

Preferably, the throttle valve actuating device (10) is modeled to a controlled object model which includes a dead time element, and the predicting means (23) predicts a throttle valve opening after the elapse of a dead time (d) due to the dead time element, based on the controlled object model.

With this configuration, the throttle valve actuating device (10) is modeled to the controlled object model including a dead time element, and the throttle valve opening after the elapse of a dead time is predicted based on the controlled object model. Accordingly, compensation of the dead time in the throttle valve actuating device can accurately be performed.

Preferably, the control system further includes identifying means (22) for identifying at least one model parameter (a1, a2, b1, c1) of the controlled object model. The predicting means (23) predicts the throttle valve opening (PREDTH) using the at least one model parameter (a1, a2, b1, c1) identified by the identifying means (22).

With this configuration, the throttle valve opening is predicted using one or more model parameter identified by the identifying means. Accordingly, it is possible to calculate an accurate predicted throttle valve opening even when the dynamic characteristic of the throttle valve actuating device has changed due to aging or a change in the environmental condition.

Preferably, the control system further includes a sliding mode controller (21) for controlling the throttle valve actuating device (10) with a sliding mode control according to a throttle valve opening (PREDTH) predicted by the predicting means (23).

With this configuration, the throttle valve actuating device is controlled with the sliding mode control having good robustness. Accordingly, good stability and controllability of the control can be maintained even when there exists a modeling error (a difference between the characteristics of the actual plant and the characteristics of the controlled object model) due to a difference between the actual dead time of the throttle valve actuating device and the dead time of the controlled object model.

Preferably, the sliding mode controller (21) controls the throttle valve actuating device (10) using the at least one model parameter (a1, a2, b1, c1) identified by the identifying means (22).

With this configuration, the throttle valve actuating device is controlled by the sliding mode controller using one or more model parameter identified by the identifying means. Accordingly, the modeling error can be made smaller so that the controllability is further improved.

Preferably, the control input (Usl) from the sliding mode controller (21) to the throttle valve actuating device (10) includes an adaptive law input (Uadp).

With this configuration, better controllability is obtained even in the presence of disturbance and/or the modeling error.

The above and other objects, features, and advantages of the present invention will become apparent from the following description when taken in conjunction with the accompanying drawings which illustrate embodiments of the present invention by way of example.

BRIEF DESCRIPTION OF THE DRAWINGS

FIG. 1 is a schematic view of a throttle valve control system according to a first embodiment of the present invention;

FIGS. 2A and 2B are diagrams showing frequency characteristics of the throttle valve actuating device shown in FIG. 1;

DETAILED DESCRIPTION OF THE PREFERRED EMBODIMENTS

Figure 3:
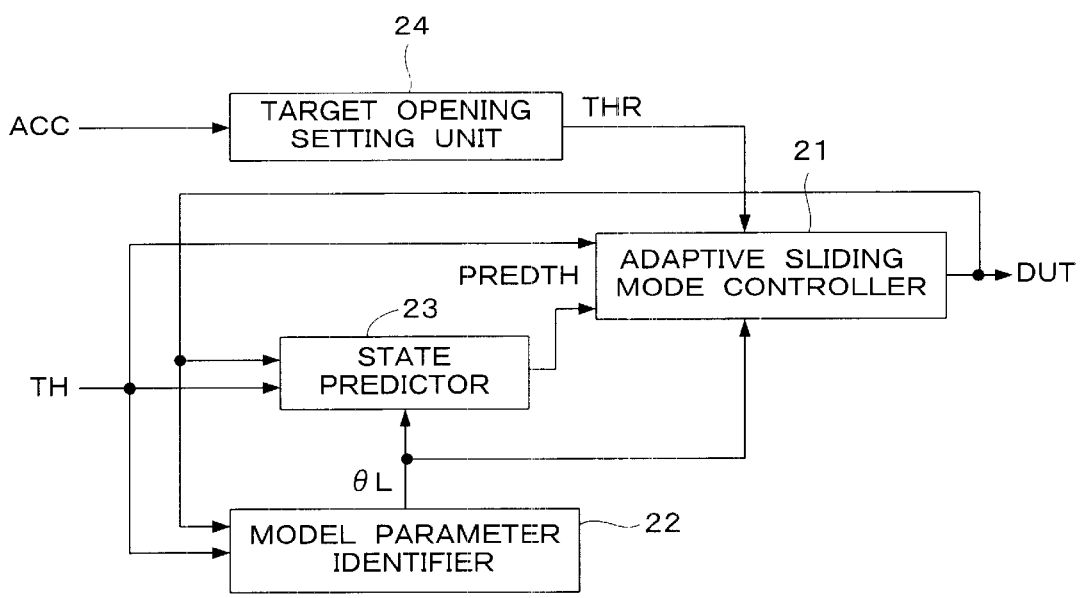
FIG. 3 is a functional block diagram showing functions realized by an electronic control unit (ECU) shown in FIG. 1.

FIG. 1 schematically shows a configuration of a throttle valve control system according to a first embodiment of the present invention. An internal combustion engine (hereinafter referred to as "engine") 1 has an intake passage 2 with a throttle valve 3 disposed therein. The throttle valve 3 is provided with a return spring 4 as a first energizing means for energizing the throttle valve 3 in a closing direction, and a resilient member 5 as a second energizing means for energizing the throttle valve 3 in an opening direction. The throttle valve 3 can be actuated by a motor 6 as an actuating means through gears (not shown). When the actuating force from the motor 6 is not applied to the throttle valve 3, an opening TH of the throttle valve 3 is maintained at a default opening THDEF (for example, 5 degrees) where the energizing force of the return spring 4 and the energizing force of the resilient member 5 are in equilibrium.

The motor 6 is connected to an electronic control unit (hereinafter referred to as "ECU") 7. The operation of the motor 6 is controlled by the ECU 7. The throttle valve 3 is associated with a throttle valve opening sensor 8 for detecting the throttle valve opening TH. A detected signal from the throttle valve opening sensor 8 is supplied to the ECU 7.

Further, the ECU 7 is connected to an acceleration sensor 9 for detecting a depression amount ACC of an accelerator pedal to detect an output demanded by the driver of the vehicle on which the engine 1 is mounted. A detected signal from the acceleration sensor 9 is supplied to the ECU 7.

The ECU 7 has an input circuit, an A/D converter, a central processing unit (CPU), a memory circuit, and an output circuit. The input circuit is supplied with detected signals from the throttle valve opening sensor 8 and the acceleration sensor 9. The A/D converter converts input signals into digital signals. The CPU carries out various process operations. The memory circuit has a ROM (read only memory) for storing processes executed by the CPU, and maps and tables that are referred to in the processes, a RAM for storing results of executing processes by the CPU. The output circuit supplies an energizing current to the motor 6. The ECU 7 determines a target opening THR of the throttle valve 3 according to the depression amount ACC of the accelerator pedal, determines a control quantity DUT for the motor 6 in order to make the detected throttle valve opening TH coincide with the target opening THR, and supplies an electric signal according to the control quantity DUT to the motor 6.

In the present embodiment, a throttle valve actuating device 10 that includes the throttle valve 3, the return spring 4, the resilient member 5, and the motor 6 is a controlled object. An input to be applied to the controlled object is a duty ratio DUT of the electric signal applied to the motor 6. An output from the controlled object is the throttle valve opening TH detected by the throttle valve opening sensor 8.

When frequency response characteristics of the throttle valve actuating device 10 are measured, gain characteristics and phase characteristics indicated by the solid lines in FIGS. 2A and 2B are obtained. A model defined by the equation (1) shown below is set as a controlled object model. Frequency response characteristics of the model are indicated by the broken-line curves in FIGS. 2A and 2B. It has been confirmed that the frequency response characteristics of the model are similar to the characteristics of the throttle valve actuating device 10.

$$DTH(k+1)=a1 \times DTH(k)+a2 \times DTH(k-1)+b1 \times DUT(k-d)+c1 \qquad (1)$$

where k is a parameter representing discrete time, and DTH(k) is a throttle valve opening deviation amount defined by the equation (2) shown below. DTH(k+1) is a throttle valve opening deviation amount at a discrete time (k+1).

$$DTH(k)=TH(k)-THDEF \qquad (2)$$

where TH is a detected throttle valve opening, and THDEF is the default opening.

In the equation (1), a1, a2, b1, and c1 are parameters determining the characteristics of the controlled object model, and d is a dead time. The dead time is a delay between the input and output of the controlled object model.

The model defined by the equation (1) is a DARX model (delayed autoregressive model with exogenous input) of a discrete time system, which is employed for facilitating the application of an adaptive control.

In the equation (1), the model parameter c1 which is irrelevant to the input and output of the controlled object is employed, in addition to the model parameters a1 and a2 which are relevant to the output deviation amount DTH and the model parameter b1 which is relevant to the input duty ratio DUT. The model parameter c1 is a parameter representing a deviation amount of the default opening THDEF and disturbance applied to the throttle valve actuating device 10. In other words, the default opening deviation amount and the disturbance can be identified by identifying the model parameter c1 simultaneously with the model parameters a1, a2, and b1 by a model parameter identifier.

FIG. 3 is a functional block diagram of the throttle valve control system which is realized by the ECU 7. The throttle valve control system as configured includes, an adaptive sliding mode controller 21, a model parameter identifier 22, a state predictor 23 for calculating a predicted throttle valve opening deviation amount (hereinafter referred to as "predicted deviation amount" or PREDTH(k)) where PREDTH (k) (=DTH(k+d)) after the dead time d has elapsed, and a target opening setting unit 24 for setting a target opening THR for the throttle valve 3 according to the accelerator pedal depression amount ACC.

The adaptive sliding mode controller 21 calculates a duty ratio DUT according to an adaptive sliding mode control in order to make the detected throttle valve opening TH coincide with the target opening THR, and outputs the calculated duty ratio DUT.

By using the adaptive sliding mode controller 21, it is possible to change the response characteristics of the throttle valve opening TH to the target opening THR, using a specific parameter (VPOLE). As a result, it is possible to avoid shocks at the time the throttle valve 3 moves from an open position to a fully closed position, i.e., at the time the throttle valve 3 collides with a stopper for stopping the throttle valve 3 in the fully closed position. It is also possible to make the engine response corresponding to the operation of the accelerator pedal variable. Further, it is also possible to obtain a good stability against errors of the model parameters.

The model parameter identifier 22 calculates a corrected model parameter vector θL ($\theta L^T$=[a1, a2, b1, c1]) and supplies the calculated corrected model parameter vector θL to the adaptive sliding mode controller 21. More specifically, the model parameter identifier 22 calculates a model parameter vector θ based on the throttle valve opening TH and the duty ratio DUT. The model parameter identifier 22 then carries out a limit process of the model parameter vector θ to calculate the corrected model parameter vector θL, and supplies the corrected model parameter vector θL to the adaptive sliding mode controller 21. In this manner, the model parameters a1, a2, and b1 which are optimum for making the throttle valve opening TH follow up the target opening THR are obtained, and also the model parameter c1 indicative of disturbance and a deviation amount of the default opening THDEF is obtained.

By using the model parameter identifier 22 for identifying the model parameters on a real-time basis, adaptation to changes in engine operating conditions, compensation for hardware characteristics variations, compensatation for power supply voltage fluctuations, and adaptation to aging-dependent changes of hardware characteristics are possible.

The state predictor 23 calculates a throttle valve opening TH (predicted value) after the dead time d has elapsed, or more specifically a predicted deviation amount PREDTH, based on the throttle valve opening TH and the duty ratio DUT, and supplies the calculated deviation amount PREDTH to the adaptive sliding mode controller 21. By using the predicted deviation amount PREDTH, the robustness of the control system against the dead time of the controlled object is ensured, and the controllability in the vicinity of the default opening THDEF where the dead time is large is improved.

Next, principles of operation of the adaptive sliding mode controller 21 will be hereinafter described.

First, a target value DTHR(k) is defined as a deviation amount between the target opening THR(k) and the default opening THDEF by the following equation (3).

$$DTHR(k)=THR(k)-THDEF \qquad (3)$$

If a deviation e(k) between the throttle valve opening deviation amount DTH and the target value DTHR is defined by the following equation (4), then a switching function value σ(k) of the adaptive sliding mode controller is set by the following equation (5).

$$e(k) = DTH(k) - DTHR(k) \qquad (4)$$

$$\begin{aligned}\sigma(k) &= e(k) + VPOLE \times e(k-1) \\ &= DTH(k) - DTHR(k) + \\ & \quad VPOLE \times (DTH(k-1) - DTHR(k-1))\end{aligned} \qquad (5)$$

where VPOLE is a switching function setting parameter that is set to a value which is greater than −1 and less than 1.

On a phase plane defined by a vertical axis representing the deviation e(k) and a horizontal axis representing the preceding deviation e(k−1), a pair of the deviation e(k) and the preceding deviation e(k−1) satisfying the equation of "σ(k)=0" represents a straight line. The straight line is generally referred to as a switching straight line. A sliding mode control is a control contemplating the behavior of the deviation e(k) on the switching straight line. The sliding mode control is carried out so that the switching function value σ(k) becomes 0, i.e., the pair of the deviation e(k) and the preceding deviation e(k−1) exists on the switching straight line on the phase plane, to thereby achieve a robust control against disturbance and the modeling error (the difference between the characteristics of an actual plant and the characteristics of a controlled object model). As a result, the throttle valve opening deviation amount DTH is controlled with good robustness to follow up the target value DTHR.

Figure 4:
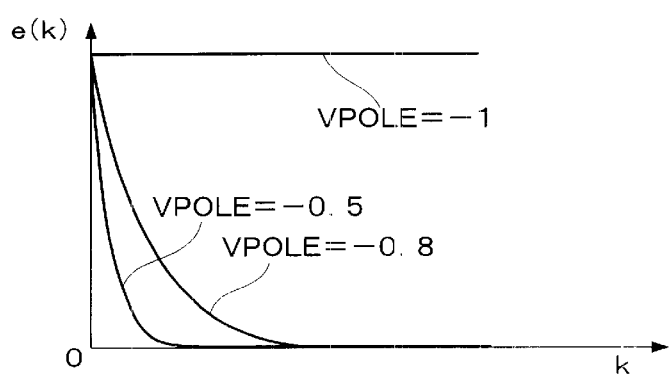
FIG. 4 is a diagram showing the relationship between control characteristics of a sliding mode controller and the value of a switching function setting parameter (VPOLE)

As shown in FIG. 4, by changing the value of the switching function setting parameter VPOLE in the equation (5), it is possible to change damping characteristics of the deviation e(k), i.e., the follow-up characteristics of the throttle valve opening deviation amount DTH to follow the target value DTHR. Specifically, if VPOLE equals −1, then the throttle valve opening deviation amount DTH completely fails to follow up the target value DTHR. As the absolute value of the switching function setting parameter VPOLE is reduced, the speed at which the throttle valve opening deviation amount DTH follows up the target value DTHR increases.

The throttle valve control system is required to satisfy the following requirements A1 and A2:

A1) When the throttle valve 3 is shifted to the fully closed position, collision of the throttle valve 3 with the stopper for stopping the throttle valve 3 in the fully closed position should be avoided; and A2) The controllability with respect to the nonlinear characteristics in the vicinity of the default opening THDEF (a change in the resiliency characteristics due to the equilibrium between the energizing force of the return spring 4 and the energizing force of the resilient member 5, backlash of gears interposed between the motor 6 and the throttle valve 3, and a dead zone where the throttle valve opening does not change even when the duty ratio DUT changes) should be improved.

Therefore, it is necessary to lower the speed at which the deviation e(k) converges, i.e., the converging speed of the deviation e(k), in the vicinity of the fully closed position of the throttle valve, and to increase the converging speed of the deviation e(k) in the vicinity of the default opening THDEF.

According to the sliding mode control, the converging speed of e(k) can easily be changed by changing the switching function setting parameter VPOLE. Therefore in the present embodiment, the switching function setting parameter VPOLE is set according to the throttle valve opening TH and an amount of change DDTHR (=DTHR(k)−DTHR(k−1)) of the target value DTHR, to thereby satisfy the requirements A1 and A2.

As described above, according to the sliding mode control, the deviation e(k) is converged to 0 at an indicated converging speed and robustly against disturbance and the modeling error by constraining the pair of the deviation e(k) and the preceding deviation e(k−1) on the switching straight line (the pair of e(k) and e(k−1) will be hereinafter referred to as "deviation state quantity"). Therefore, in the sliding mode control, it is important how to place the deviation state quantity onto the switching straight line and constrain the deviation state quantity on the switching straight line.

From the above standpoint, an input DUT(k) (also indicated as Usl(k)) to the controlled object (an output of the controller) is expressed as the sum of an equivalent control input Ueq(k), a reaching law input Urch(k), and an adaptive law input Uadp(k), as indicated by the following equation (6).

$$DUT(k) = Usl(k) \quad (6)$$
$$= Ueq(k) + Urch(k) + Uadp(k)$$

The equivalent control input Ueq(k) is an input for constraining the deviation state quantity on the switching straight line. The reaching law input Urch(k) is an input for placing deviation state quantity onto the switching straight line. The adaptive law input Uadp(k) is an input for placing deviation state quantity onto the switching straight line while reducing the modeling error and the effect of disturbance. Methods of calculating these inputs Ueq(k), Urch(k), and Uadp(k) will be described below.

Since the equivalent control input Ueq(k) is an input for constraining the deviation state quantity on the switching straight line, a condition to be satisfied is given by the following equation (7):

$$\sigma(k)=\sigma(k+1) \quad (7)$$

Using the equations (1), (4), and (5), the duty ratio DUT(k) satisfying the equation (7) is determined by the equation (9) shown below. The duty ratio DUT(k) calculated with the equation (9) represents the equivalent control input Ueq(k). The reaching law input Urch(k) and the adaptive law input Uadp(k) are defined by the respective equations (10) and (11) shown below.

$$DUT(k) = \frac{1}{b1}\{[1-a1-VPOLE)DTH(k+d) + \quad (9)$$
$$(VPOLE-a2)DTH(k+d-1)-c1 +$$
$$DTHR(k+d+1)+(VPOLE-1)DTHR(k+d)-$$
$$VPOLE \times DTHR(k+d-1)\}$$
$$= Ueq(k)$$

$$Urch(k) = \frac{-F}{b1}\sigma(k+d) \quad (10)$$

$$Uadp(k) = \frac{-G}{b1}\sum_{i=0}^{k+d} \Delta T \sigma(i) \quad (11)$$

where F and G respectively represent a reaching law control gain and an adaptive law control gain, which are set as described below, and ΔT represents a control period.

Calculating the equation (9) requires a throttle valve opening deviation amount DTH(k+d) after the elapse of the dead time d and a corresponding target value DTHR(k+d+1). Therefore, the predicted deviation amount PREDTH(k) calculated by the state predictor 23 is used as the throttle valve opening deviation amount DTH(k+d) after the elapse of the dead time d, and the latest target value DTHR is used as the target value DTHR(k+d+1).

Next, the reaching law control gain F and the adaptive law control gain G are determined so that the deviation state quantity can stably be placed onto the switching straight line by the reaching law input Urch and the adaptive law input Uadp.

Figure 5:
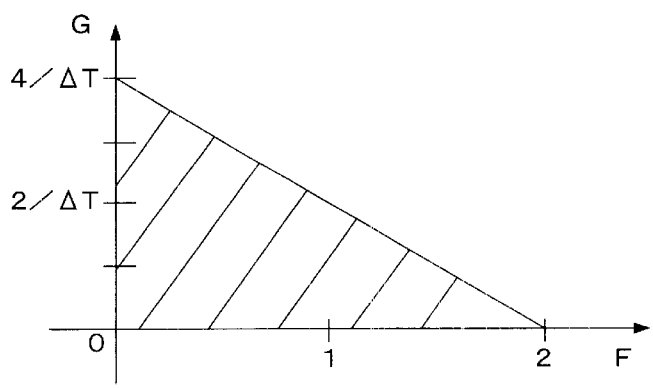
FIG. 5 is a diagram showing a range for setting control gains (F, G) of the sliding mode controller.

Specifically, a disturbance V(k) is assumed, and a stability condition for keeping the switching function value σ(k) stable against the disturbance V(k) are determined to obtain a condition for setting the gains F and G. As a result, it has been obtained as the stability condition that the combination of the gains F and G satisfies the following equations (12) through (14), in other words, the combination of the gains F and G should be located in a hatched region shown in FIG. 5.

$$F>0 \quad (12)$$

$$G>0 \quad (13)$$

$$F<2-(\Delta T/2)G \quad (14)$$

As described above, the equivalent control input Ueq(k), the reaching law input Urch(k), and the adaptive law input Uadp(k) are calculated from the equations (9) through (11), and the duty ratio DUT(k) is calculated as the sum of those inputs.

The model parameter identifier 22 calculates a model parameter vector of the controlled object model, based on the input (DUT(k)) and output (TH(k)) of the controlled object, as described above. Specifically, the model parameter identifier 22 calculates a model parameter vector θ(k)

according to a sequential identifying algorithm (generalized sequential method-of-least-squares algorithm) represented by the following equation (15).

$$\theta(k)=\theta(k-1)+KP(k)ide(k) \quad (15)$$

$$\theta(k)^T=[a1', a2', b1', c1'] \quad (16)$$

where a1', a2', b1', c1' represent model parameters before a limit process described later is carried out, ide(k) represents an identifying error defined by the equations (17), (18), and (19) shown below, where DTHHAT(k) represents an estimated value of the throttle valve opening deviation amount DTH(k) (hereinafter referred to as "estimated throttle valve opening deviation amount") which is calculated using the latest model parameter vector θ(k−1), and KP(k) represents a gain coefficient vector defined by the equation (20) shown below. In the equation (20), P(k) represents a quartic square matrix calculated from the equation (21) shown below.

$$i\,d\,e\,(k)=DTH(k)-DTHHAT(k) \quad (17)$$

$$DTHHAT(k)=\theta(k-1)^T\zeta(k) \quad (18)$$

$$\zeta(k)^T=[DTH(k-1), DTH(k-2), DUT(k-d-1), 1] \quad (19)$$

$$KP(k) = \frac{P(k)\zeta(k)}{1+\zeta^T(k)P(k)\zeta(k)} \quad (20)$$

$$P(k+1) = \frac{1}{\lambda_1}\left(\mathbb{1} - \frac{\lambda_2 P(k)\zeta(k)\zeta^T(k)}{\lambda_1+\lambda_2\zeta^T(k)P(k)\zeta(k)}\right)P(k) \quad (21)$$

(1 : Identity Matrix)

In accordance with the setting of coefficients λ1 and λ2 in the equation (21), the identifying algorithm from the equations (15) through (21) becomes one of the following four identifying algorithm:

| | |
|---|---|
| λ1 = 1, λ2 = 0 | Fixed gain algorithm |
| λ1 = 1, λ2 = 1 | Method-of-least-squares algorithm |
| λ1 = 1, λ2 = λ | Degressive gain algorithm (λ is a given value other than 0, 1) |
| λ1 = λ, λ2 = 1 | Weighted Method-of-least- squares algorithm (λ is a given value other than 0, 1) |

In the present embodiment, it is required that the following requirements B1, B2, and B3 are satisfied:

B1) Adaptation to quasi-static dynamic characteristics changes and hardware characteristics variations
"Quasi-static dynamic characteristics changes" mean slow-rate characteristics changes such as power supply voltage fluctuations or hardware degradations due to aging.

B2) Adaptation to high-rate dynamic characteristics changes
Specifically, this means adaptation to dynamic characteristics changes depending on changes in the throttle valve opening TH.

B3) Prevention of a drift of model parameters
The drift, which is an excessive increase of the absolute values of model parameters, should be prevented. The drift of model parameters is caused by the effect of the identifying error, which should not be reflected to the model parameters, due to nonlinear characteristics of the controlled object.

In order to satisfy the requirements B1 and B2, the coefficients λ1 and λ2 are set respectively to a given value λ and "0" so that the weighted Method-of-least-squares algorithm is employed.

Figure 6A:
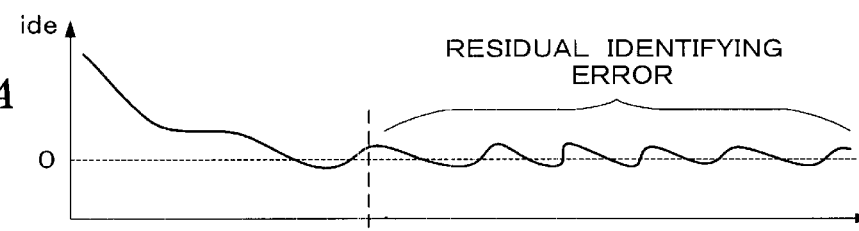
FIGS. 6A and 6B are diagrams illustrative of a drift of model parameters.
Figure 6B:
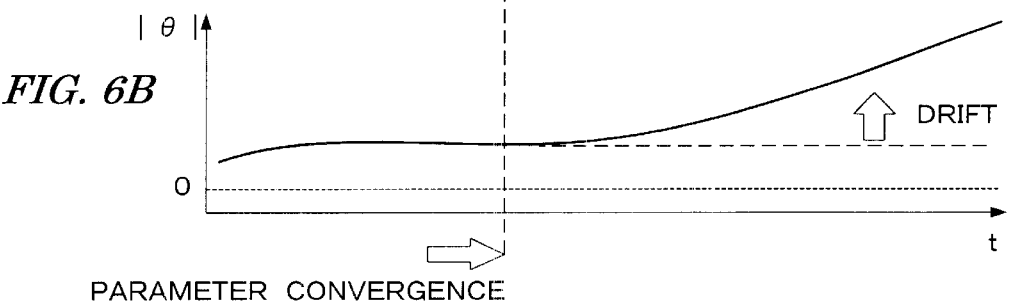

Next, the drift of model parameters will be described below. As shown in FIG. 6A and FIG. 6B, if a residual identifying error, which is caused by nonlinear characteristics such as friction characteristics of the throttle valve, exists after the model parameters have been converged to a certain extent, or if a disturbance whose average value is not zero is steadily applied, then residual identifying errors are accumulated, causing a drift of model parameters.

Figure 7A:
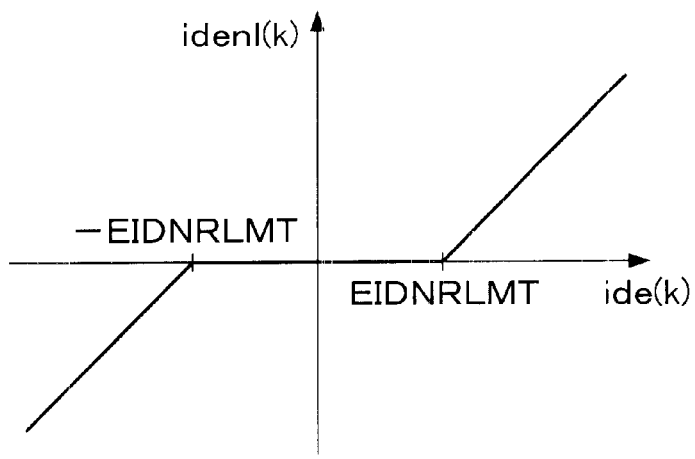
FIGS. 7A through 7C are diagrams showing functions for correcting an identifying error.

Since such a residual identifying error should not be reflected to the values of model parameters, a dead zone process is carried out using a dead zone function Fn1 as shown in FIG. 7A. Specifically, a corrected identifying error idenl(k) is calculated from the following equation (23), and a model parameter vector θ(k) is calculated using the corrected identifying error idenl(k). That is, the following equation (15a) is used instead of the above equation (15). In this manner, the requirement B3) can be satisfied.

$$idenl(k)=Fnl(ide(k)) \quad (23)$$

$$\theta(k)=\theta(k-1)+KP(k)idenl(k) \quad (15a)$$

Figure 7B:
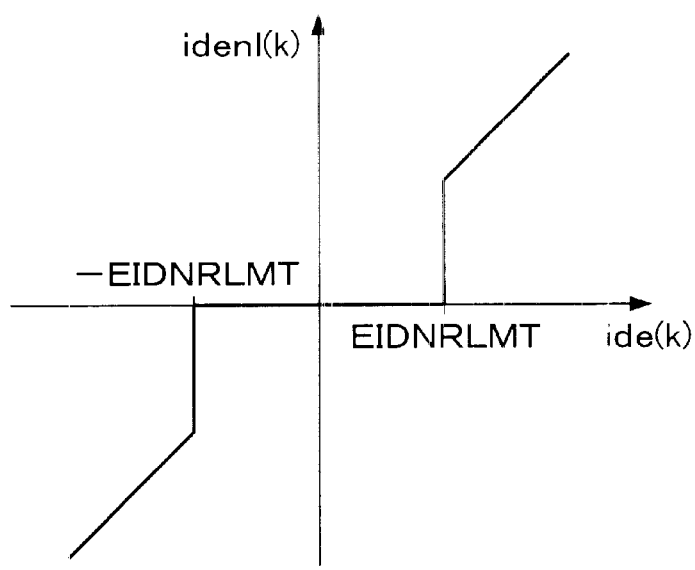
Figure 7C:
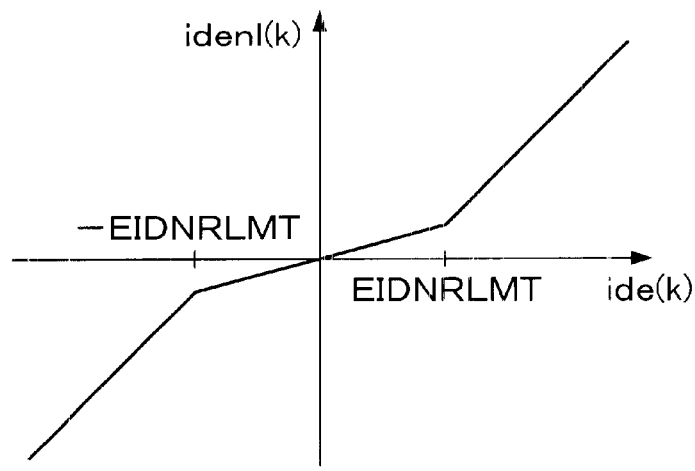

The dead zone function Fn1 is not limited to the function shown in FIG. 7A. A discontinuous dead zone function as shown in FIG. 7B or an incomplete dead zone function as shown in FIG. 7C may be used as the dead zone function Fnl. However, it is impossible to completely prevent the drift if the incomplete dead zone function is used.

The amplitude of the residual identifying error changes according to an amount of change in the throttle valve opening TH. In the present embodiment, a dead zone width parameter EIDNRLMT which defines the width of the dead zone shown in FIGS. 7A through 7C is set according to the square average value DDTHRSQA of an amount of change in the target throttle valve opening THR. Specifically, the dead zone width parameter EIDNRLMT is set such that it increases as the square average value DDTHRSQA increases. According to such setting of the dead zone width parameter EIDNRLMT, it is prevented to neglect an identifying error to be reflected to the values of the model parameters as the residual identifying error. In the following equation (24), DDTHR represents an amount of change in the target throttle valve opening THR, which is calculated from the following equation (25):

$$DDTHRSQA(k) = \frac{1}{n+1}\sum_{i=0}^{n} DDTHR(i)^2 \quad (24)$$

$$\begin{aligned}DDTHR(k) &= DTHR(k) - DTHR(k-1) \\ &= THR(k) - THR(k-1)\end{aligned} \quad (25)$$

Since the throttle valve opening deviation amount DTH is controlled to the target value DTHR by the adaptive sliding mode controller 21, the target value DTHR in the equation (25) may be changed to the throttle valve opening deviation amount DTH. In this case, an amount of change DDTH in the throttle valve opening deviation amount DTH may be calculated, and the dead zone width parameter EIDNRLMT may be set according to the square average value DDTHRSQA obtained by replacing DDTHR in the equation (24) with DDTH.

For further improving the robustness of the control system, it is effective to further stabilize the adaptive sliding mode controller 21. In the present embodiment, the elements a1', a2', b1', and c1' of the model parameter vector θ(k) calculated from the equation (15) are subjected to the limit process so that a corrected model parameter vector θL(k) (θL(k)$^T$=[a1, a2, b1, c1]) is calculated. The adaptive sliding mode controller 21 performs a sliding mode control using the corrected model parameter vector θL(k). The limit process will be described later in detail referring to the flowcharts.

Next, a method for calculating the predicted deviation amount PREDTH in the state predictor 23 will be described below.

First, matrixes A, B and vectors X(k), U(k) are defined according to the following equations (26) through (29).

$$A = \begin{bmatrix} a1 & a2 \\ 1 & 0 \end{bmatrix} \quad (26)$$

$$B = \begin{bmatrix} b1 & c1 \\ 0 & 0 \end{bmatrix} \quad (27)$$

$$X(k) = \begin{bmatrix} DTH(k) \\ DTH(k-1) \end{bmatrix} \quad (28)$$

$$U(k) = \begin{bmatrix} DUT(k) \\ 1 \end{bmatrix} \quad (29)$$

By rewriting the equation (1) which defines the controlled object model, using the matrixes A, B and the vectors X(k), U(k), the following equation (30) is obtained.

$$X(k+1) = AX(k) + BU(k-d) \quad (30)$$

Determining X(k+d) from the equation (30), the following equation (31) is obtained.

$$X(k+d) = A^d X(k) + [A^{d-1}B \quad A^{d-2}B \quad \ldots \quad AB \quad B] \begin{bmatrix} U(k-1) \\ U(k-2) \\ \vdots \\ U(k-d) \end{bmatrix} \quad (31)$$

If matrixes A' and B' are defined by the following equations (32), (33), using the model parameters a1', a2', b1', and c1' which are not subjected to the limit process, a predicted vector XHAT(k+d) is given by the following equation (34).

$$A' = \begin{bmatrix} a1' & a2' \\ 1 & 0 \end{bmatrix} \quad (32)$$

$$B' = \begin{bmatrix} b1' & c1' \\ 0 & 0 \end{bmatrix} \quad (33)$$

$$XHAT(k+d) = \quad (34)$$

$$A'^d X(k) + [A'^{d-1}B' \quad A'^{d-2}B' \quad \ldots \quad A'B' \quad B'] \begin{bmatrix} U(k-1) \\ U(k-2) \\ \vdots \\ U(k-d) \end{bmatrix}$$

The first-row element DTHHAT(k+d) of the predicted vector XHAT(k+d) corresponds to the predicted deviation amount PREDTH(k), and is given by the following equation (35).

$$PREDTH(k) = DTHHAT(k+d) \quad (35)$$

$$= \alpha 1 \times DTH(k) + \alpha 2 \times DTH(k-1) +$$
$$\beta 1 \times DUT(k-1) + \beta 2 \times DUT(k-2) + \ldots +$$
$$\beta d \times DUT(k-d) + \gamma 1 + \gamma 2 + \ldots + \gamma d$$

where α1 represents a first-row, first-column element of the matrix A'$^d$, α2 represents a first-row, second-column element of the matrix A'$^d$, βi represents a first-row, first-column element of the matrix A'$^{d-i}$B', and γi represents a first-row, second-column element of the matrix A'$^{d-i}$B'.

By applying the predicted deviation amount PREDTH(k) calculated from the equation (35) to the equation (9), and replacing the target values DTHR(k+d+1), DTHR(k+d), and DTHR(k+d−1) respectively with DTHR(k), DTHR(k−1), and DTHR(k−2), the following equation (9a) is obtained. From the equation (9a), the equivalent control input Ueq(k) is calculated.

$$DUT(k) = \frac{1}{b1}\{(1-a1-VPOLE)PREDTH(k) + \quad (9a)$$
$$(VPOLE - a2)PREDTH(k-1) - c1 +$$
$$DTHR(k) + (VPOLE - 1)DTHR(k-1) -$$
$$VPOLE \times DTHR(k-2)\}$$
$$= Ueq(k)$$

Using the predicted deviation amount PREDTH(k) calculated from the equation (35), a predicted switching function value σpre(k) is defined by the following equation (36). The reaching law input Urch(k) and the adaptive law input Uadp(k) are calculated respectively from the following equations (10a) and (11a).

$$\sigma pre(k) = (PREDTH(k) - DTHR(k-1)) + VPOLE(PREDTH(k-1) - DTHR(k-2)) \quad (36)$$

$$Urch(k) = \frac{-F}{b1} \sigma pre(k) \quad (10a)$$

$$Uadp(k) = \frac{-G}{b1} \sum_{i=0}^{k} \Delta T \sigma pre(i) \quad (11a)$$

Figure 8:
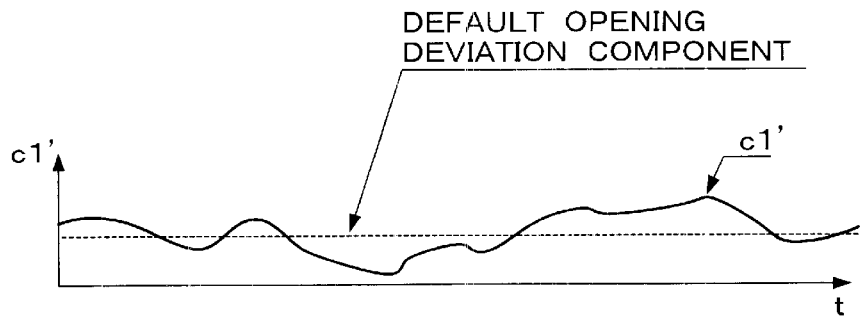
FIG. 8 is a diagram illustrating that a default opening deviation of a throttle valve is reflected to a model parameter (c1')

The model parameter c1' is a parameter representing a deviation of the default opening THDEF and disturbance. Therefore, as shown in FIG. 8, the model parameter c1' changes with disturbance, but can be regarded as substantially constant in a relatively short period. In the present embodiment, the model parameter c1' is statistically processed, and the central value of its variations is calculated as a default opening deviation thdefadp. The default opening deviation thdefadp is used for calculating the throttle valve opening deviation amount DTH and the target value DTHR.

Generally, the method of least squares is known as a method of the statistic process. In the statistic process according to the method of least squares, all data, i.e., all identified parameters c1', obtained in a certain period are stored in a memory and the stored data is subjected to a batch calculation of the statistic process at a certain timing. However, the batch calculation requires a memory having a large storage capacity for storing all data, and an increased amount of calculations are necessary because inverse matrix calculations are required.

Therefore, according to the present embodiment, the sequential method-of-least-squares algorithm for adaptive control which is indicated by the equations (15) through (21) is applied to the statistic process, and the central value of the least squares of the model parameter c1 is calculated as the default opening deviation thdefadp.

Specifically, in the equations (15) through (21), by replacing $\theta(k)$ and $\theta(k)^T$ with thdefadp, replacing $\zeta(k)$ and $\zeta(k)^T$ with "1", replacing ide(k) with ec1(k), replacing KP(k) with KPTH(k), replacing P(k) with PTH(k), and replacing $\lambda 1$ and $\lambda 2$ respectively with $\lambda 1'$ and $\lambda 2'$, the following equations (37) through (40) are obtained.

$$thdefadp(k+1) = thdefadp(k) + KPTH(k)ec1(k) \quad (37)$$

$$KPTH(k) = \frac{PTH(k)}{1 + PTH(k)} \quad (38)$$

$$PTH(k+1) = \frac{1}{\lambda_1'}\left(1 - \frac{\lambda_2' PTH(k)}{\lambda_1' + \lambda_2' PTH(k)}\right) PTH(k) \quad (39)$$

$$ec1(k) = c1'(k) - thdefadp(k) \quad (40)$$

One of the four algorithms described above can be selected according to the setting of the coefficients $\lambda 1'$ and $\lambda 2'$. In the equation (39), the coefficient $\lambda 1'$ is set to a given value other than 0 or 1, and the coefficient $\lambda 2'$ is set to 1, thus employing the weighted method of least squares.

For the calculations of the equations (37) through (40), the values to be stored are thdefadp(k+1) and PTh(k+1) only, and no inverse matrix calculations are required. Therefore, by employing the sequential method-of-least-squares algorithm, the model parameter c1 can be statistically processed according to the method of least squares while overcoming the shortcomings of a general method of least squares.

The default opening deviation thdefadp obtained as a result of the statistic process is applied to the equations (2) and (3), and the throttle valve opening deviation amount DTH(k) and the target value DTHR(k) are calculated from the following equations (41) and (42) instead of the equations (2) and (3).

$$DTH(k) = TH(k) - THDEF + thdefadp \quad (41)$$

$$DTHR(k) = THR(k) - THDEF + thdefadp \quad (42)$$

Using the equations (41) and (42), even when the default opening THDEF is shifted from its designed value due to characteristic variations or aging of the hardware, the shift can be compensated to perform an accurate control process.

Operation processes executed by the CPU in the ECU 7 for realizing the functions of the adaptive sliding mode controller 21, the model parameter identifier 22, and the state predictor 23 will be described below.

Figure 9:
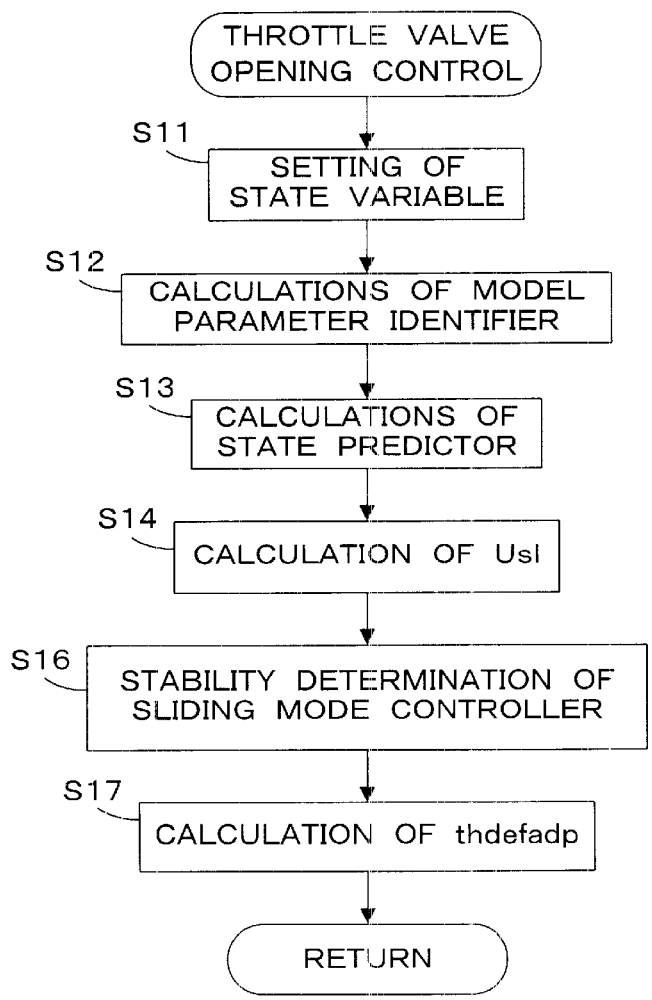
FIG. 9 is a flowchart showing a throttle valve opening control process.

FIG. 9 is a flowchart showing a process of the throttle valve opening control. The process is executed by the CPU in the ECU 7 in every predetermined period of time (e.g., 2 msec).

Figure 10:
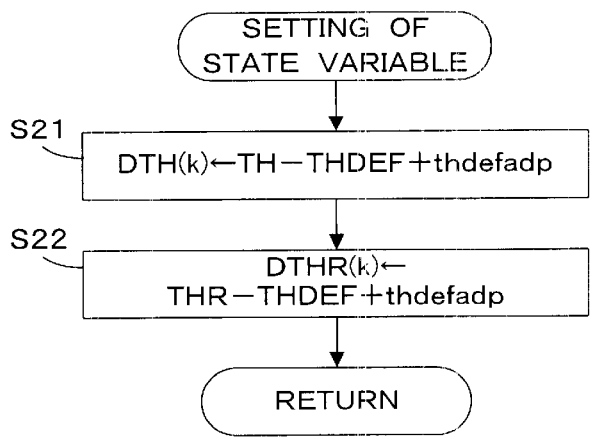
FIG. 10 is a flowchart showing a process of setting state variables in the process shown in FIG. 9.

In step S11, a process of setting a state variable shown in FIG. 10 is performed. Calculations of the equations (41) and (42) are executed to determine the throttle valve opening deviation amount DTH(k) and the target value DTHR(k) (steps S21 and S22 in FIG. 10). The symbol (k) representing a current value may sometimes be omitted as shown in FIG. 10.

Figure 11:
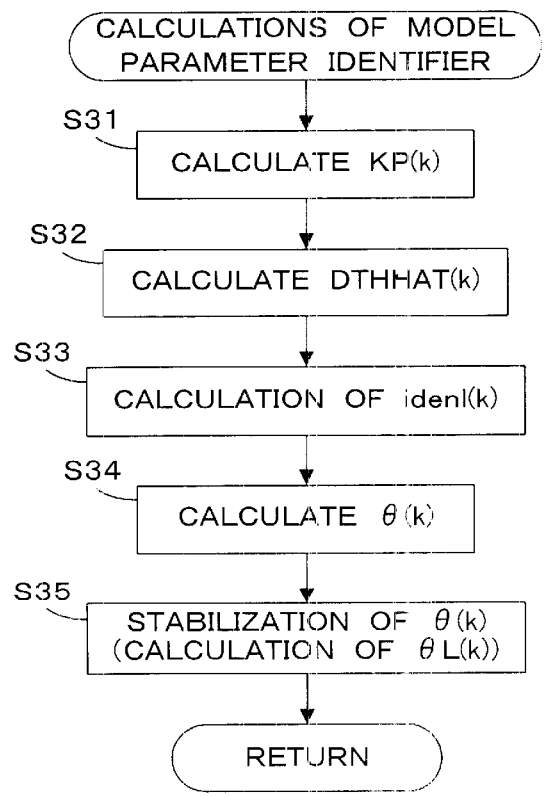
FIG. 11 is a flowchart showing a process of performing calculations of a model parameter identifier in the process shown in FIG. 9.

In step S12, a process of performing calculations of the model parameter identifier as shown in FIG. 11, i.e., a process of calculating the model parameter vector $\theta(k)$ from the equation (15a), is carried out. Further, the model parameter vector $\theta(k)$ is subjected to the limit process so that the corrected model parameter vector $\theta L(k)$ is calculated.

Figure 21:
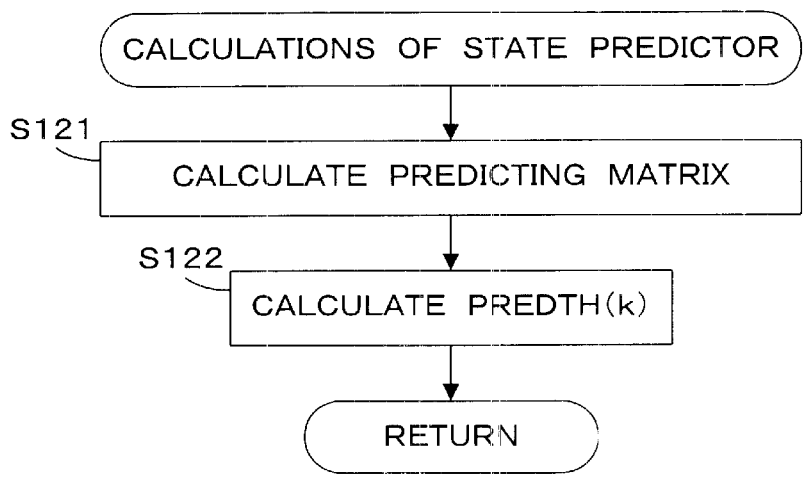
FIG. 21 is a flowchart showing a process of performing calculations of a state predictor in the process shown in FIG. 9.

In step S13, a process of performing calculations of the state predictor as shown in FIG. 21 is carried out to calculate the predicted deviation amount PREDTH(k).

Figure 22:
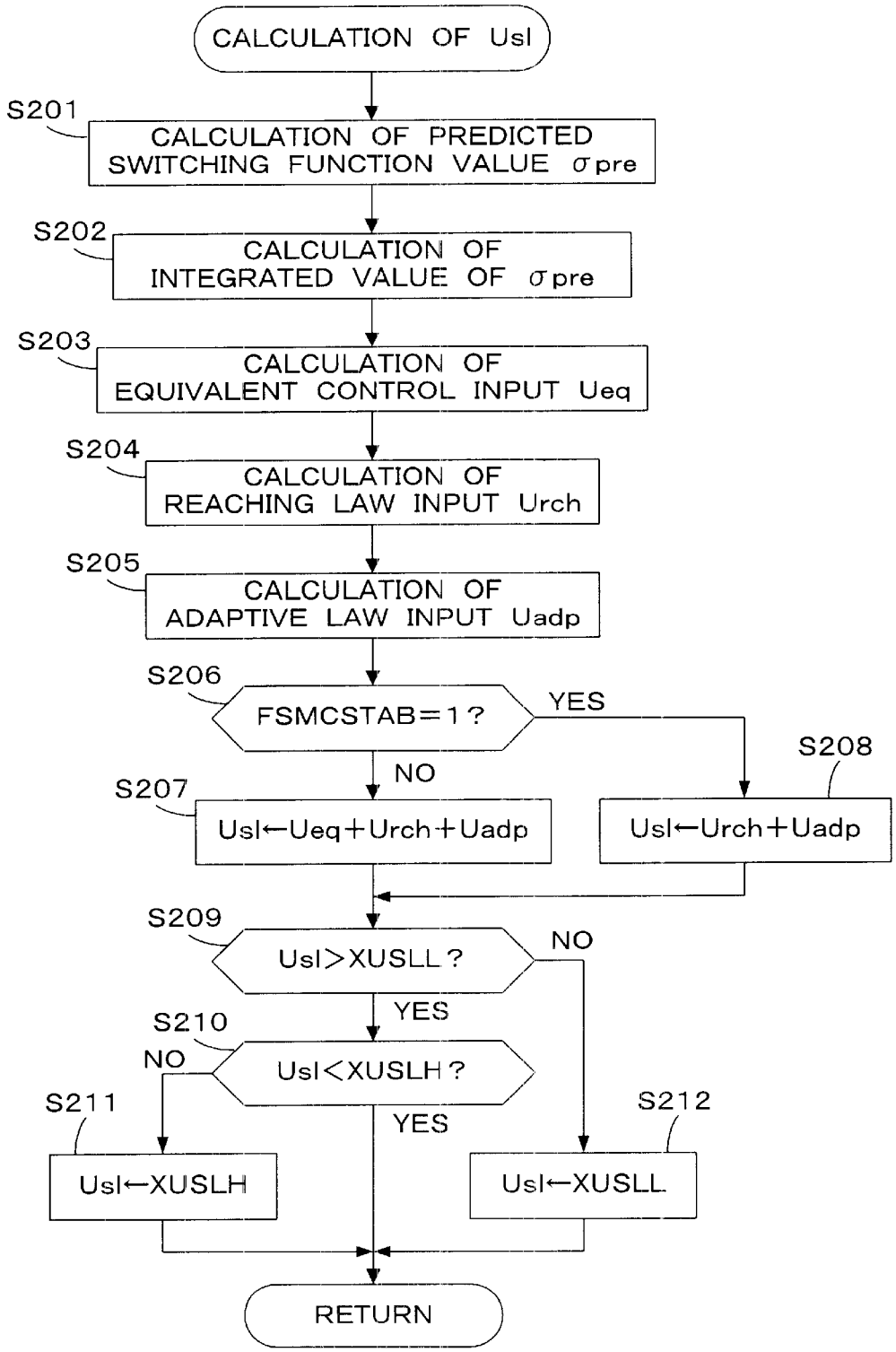
FIG. 22 is a flowchart showing a process of calculating a control input (Usl) in the process shown in FIG. 9.

Next, using the corrected model parameter vector $\theta L(k)$ calculated in step S12, a process of calculating the control input Usl(k) as shown in FIG. 22 is carried out in step S14. Specifically, the equivalent control input Ueq, the reaching law input Urch(k), and the adaptive law input Uadp(k) are calculated, and the control input Usl(k) (=duty ratio DUT (k)) is calculated as a sum of these inputs Ueq(k), Urch(k), and Uadp(k).

Figure 29:
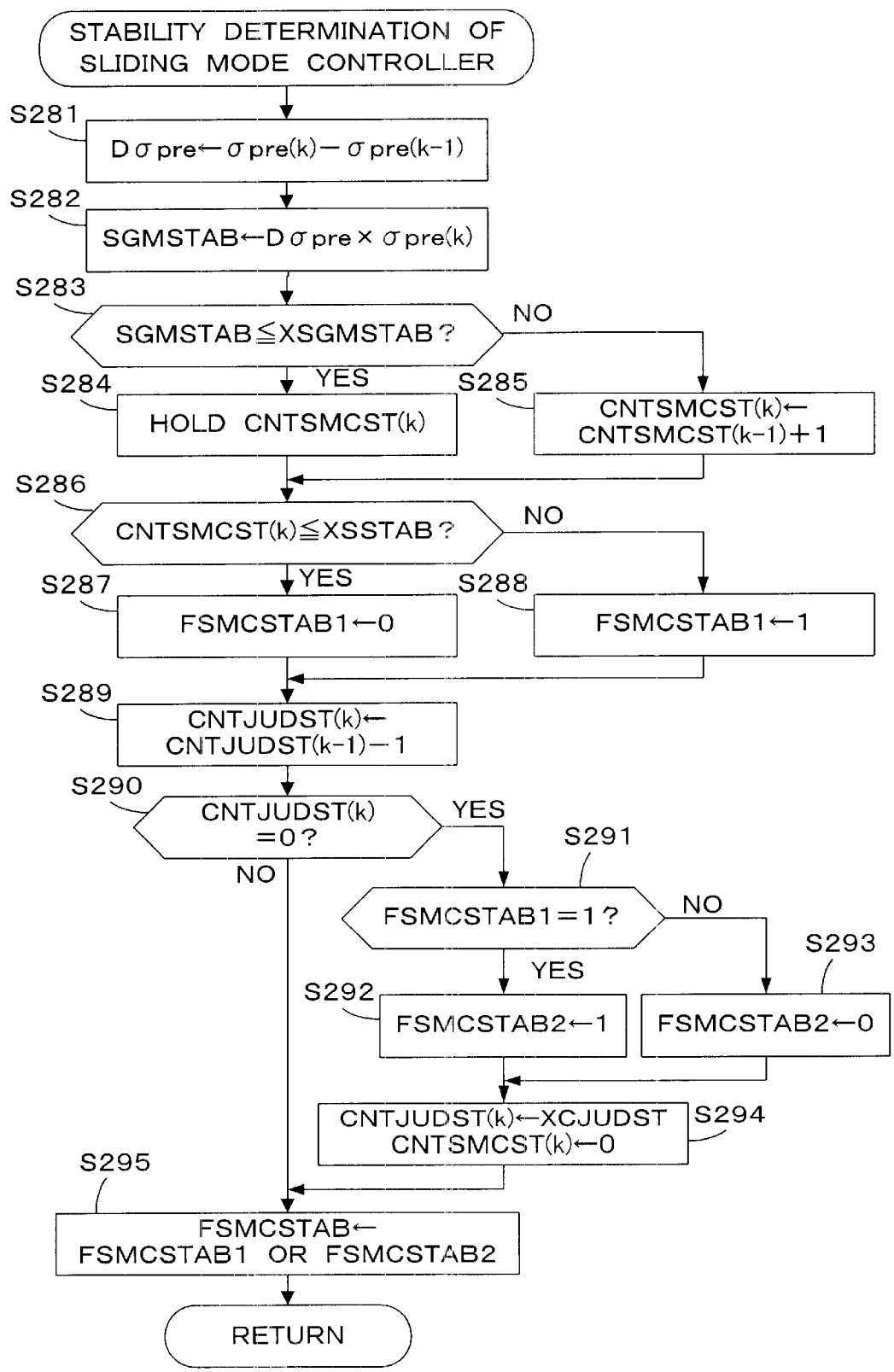
FIG. 29 is a flowchart showing a process of determining the stability of the sliding mode controller in the process shown in FIG. 9.

In step S16, a process of stability determination of the sliding mode controller as shown in FIG. 29 is carried out. Specifically, the stability is determined based on a differential value of the Lyapunov function, and a stability determination flag FSMCSTAB is set. When the stability determination flag FSMCSTAB is set to "1", this indicates that the adaptive sliding mode controller 21 is unstable.

If the stability determination flag FSMCSTAB is set to "1", indicating that the adaptive sliding mode controller 21 is unstable, the switching function setting parameter VPOLE is set to a predetermined stabilizing value XPOLESTB (see steps S231 and S232 in FIG. 24), and the equivalent control input Ueq is set to "0". That is, the control process by the adaptive sliding mode controller 21 is switched to a control process based on only the reaching law input Urch and the adaptive law input Uadp, to thereby stabilize the control (see steps S206 and S208 in FIG. 22).

Further, when the adaptive sliding mode controller 21 has become unstable, the equations for calculating the reaching law input Urch and the adaptive law input Uadp are changed. Specifically, the values of the reaching law control gain F and the adaptive law control gain G are changed to values for stabilizing the adaptive sliding mode controller 21, and the reaching law input Urch and the adaptive law input Uadp are calculated without using the model parameter b1 (see FIGS. 27 and 28). According to the above stabilizing process, it is possible to quickly terminate the unstable state of the adaptive sliding mode controller 21, and to bring the adaptive sliding mode controller 21 back to its stable state.

Figure 30:
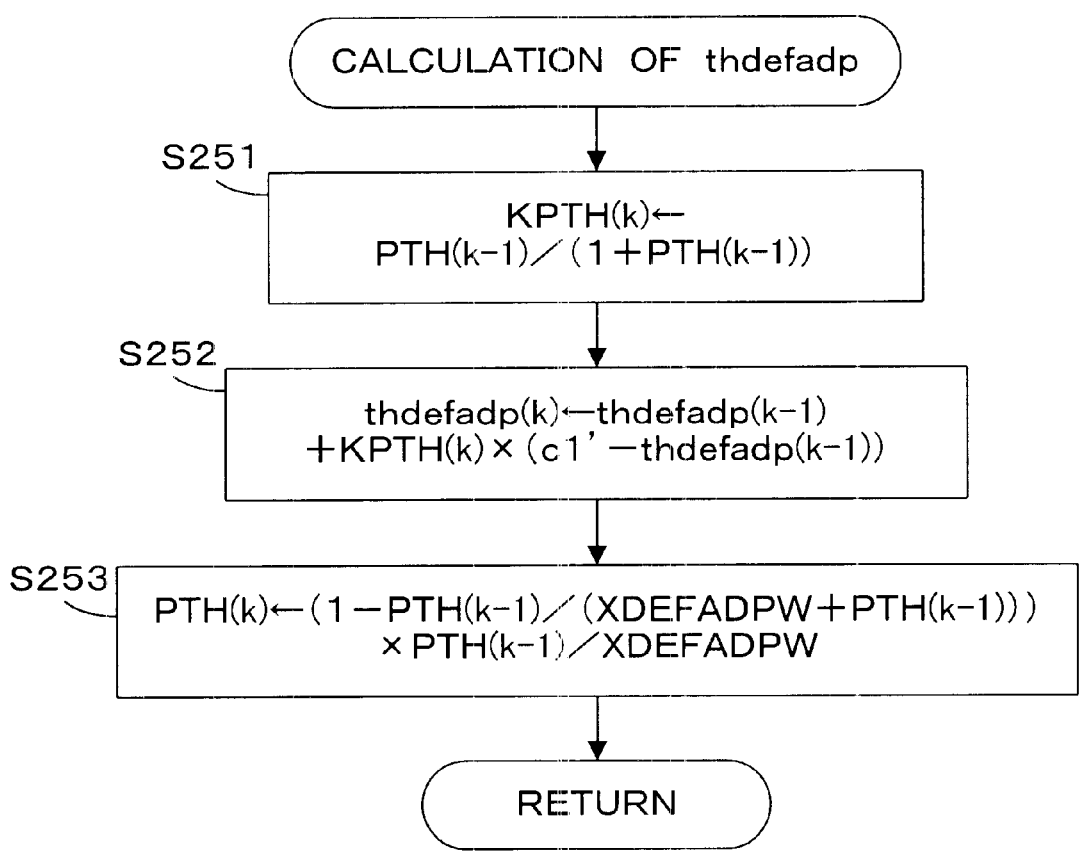
FIG. 30 is a flowchart showing a process of calculating a default opening deviation (thdefadp) in the process shown in FIG. 9.

In step S17, a process of calculating the default opening deviation thdefadp as shown in FIG. 30 is performed to calculate the default opening deviation thdefadp.

FIG. 11 is a flowchart showing a process of performing calculations of the model parameter identifier 22.

Figure 12:
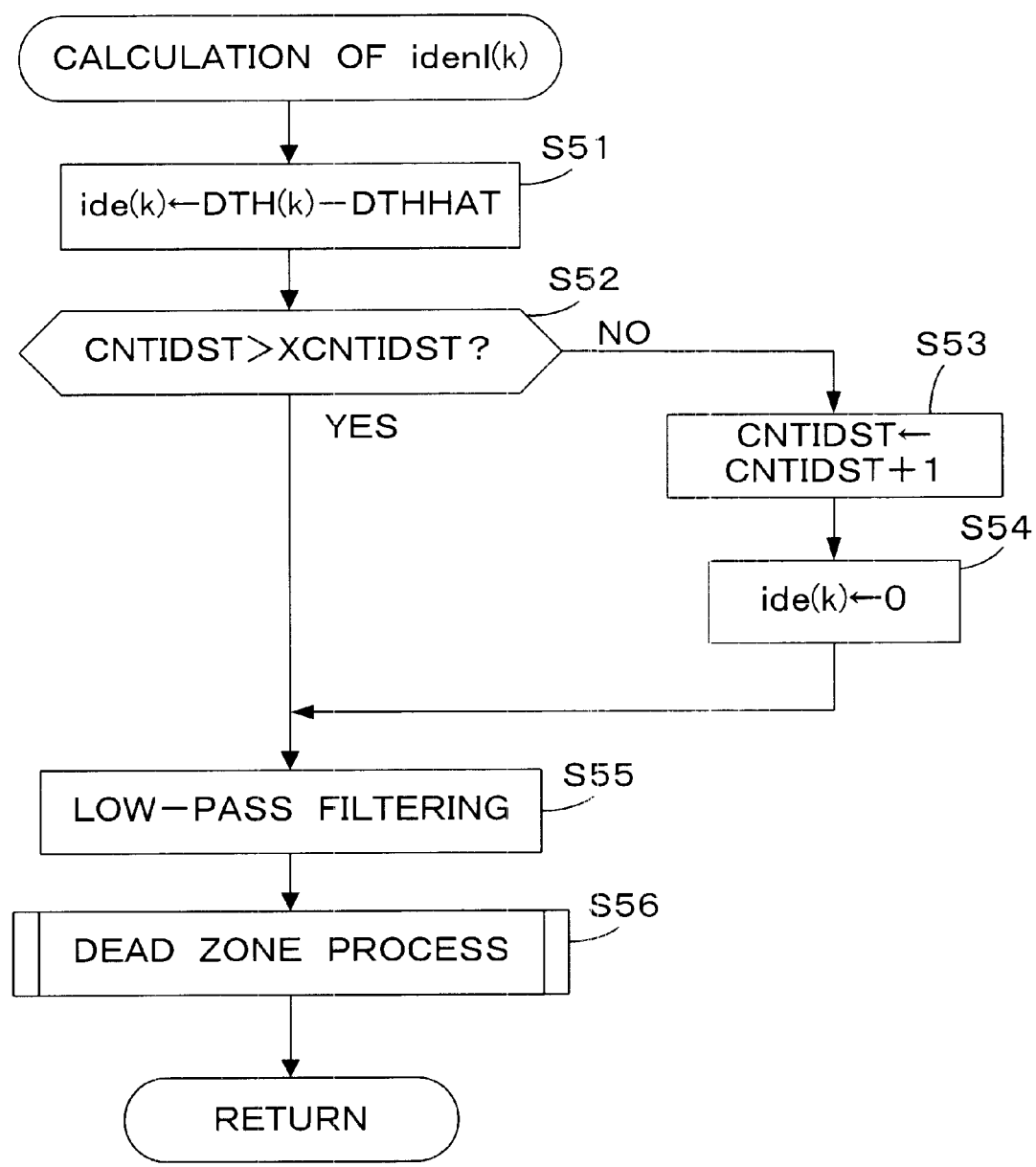
FIG. 12 is a flowchart showing a process of calculating an identifying error (ide) in the process shown in FIG. 11.

In step S31, the gain coefficient vector KP(k) is calculated from the equation (20). Then, the estimated throttle valve opening deviation amount DTHHAT(k) is calculated from the equation (18) in step S32. In step S33, a process of calculating the identifying error idenl(k) as shown in FIG. 12 is carried out. The estimated throttle valve opening deviation amount DTHHAT(k) calculated in step S32 is applied to the equation (17) to calculate the identifying error ide(k). Further in step S32, the dead zone process using the function shown in FIG. 7A is carried out to calculate the corrected identifying error idenl.

In step S34, the model parameter vector $\theta(k)$ is calculated from the equation (15a). Then, the model parameter vector $\theta(k)$ is subjected to the stabilization process in step S35. That is, each of the model parameters is subjected to the limit process to calculate the corrected model parameter vector $\theta L(k)$.

FIG. 12 is a flowchart showing a process of calculating the identifying error idenl(k) which is carried out in step S33 shown in FIG. 11.

In step S51, the identifying error ide(k) is calculated from the equation (17). Then, it is determined whether or not the value of a counter CNTIDST which is incremented in step S53 is greater than a predetermined value XCNTIDST that is set according to the dead time d of the controlled object (step S52). The predetermined value XCNTIDST is set, for example, to "3" according to a dead time d=2. Since the counter CNTIDST has an initial value of "0", the process first goes to step S53, in which the counter CNTIDST is incremented by "1". Then, the identifying error ide(k) is set to "0" in step S54, after which the process goes to step S55. Immediately after starting identifying the model parameter vector θ(k), no correct identifying error can be obtained by the equation (17). Therefore, the identifying error ide(k) is set to "0" according to steps S52 through S54, instead of using the calculated result of the equation (17).

If the answer to the step S52 is affirmative (YES), then the process immediately proceeds to step S55.

In step S55, the identifying error ide(k) is subjected to a low-pass filtering. Specifically, when identifying the model parameters of an controlled object which has low-pass characteristics, the identifying weight of the method-of-least-squares algorithm for the identifying error ide(k) has frequency characteristics as indicated by the solid line L1 in FIG. 13A. By the low-pass filtering of the identifying error ide(k), the frequency characteristics as indicated by the solid line L1 is changed to a frequency characteristics as indicated by the broken line L2 where the high-frequency components are attenuated. The reason for executing the low-pass filtering will be described below.

Figure 13A:
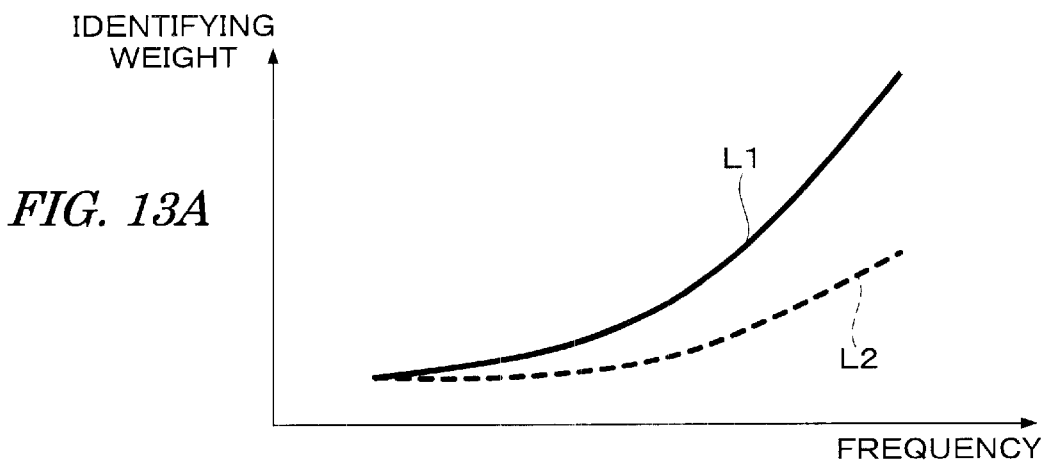
FIGS. 13A and 13B are diagrams illustrative of a process of low-pass filtering on the identifying error (ide)
Figure 13B:
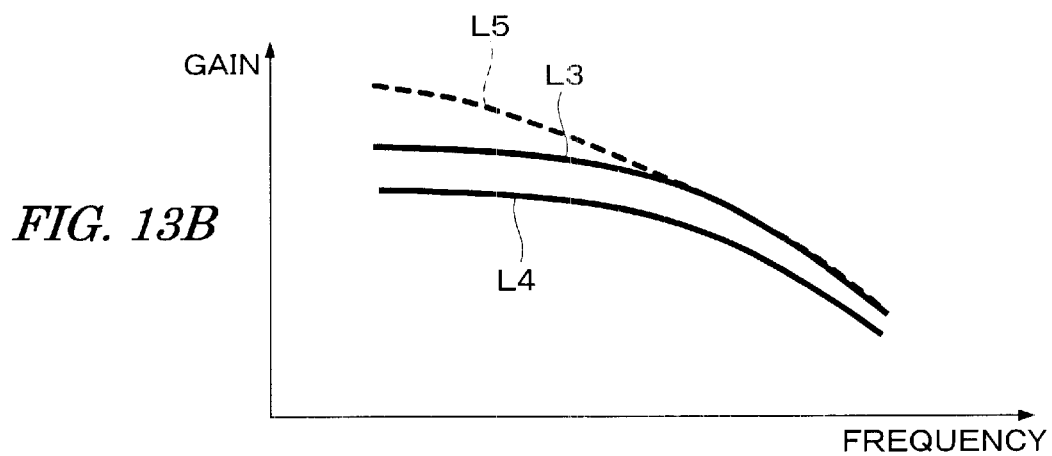

The frequency characteristics of the actual controlled object having low-pass characteristics and the controlled object model thereof are represented respectively by the solid lines L3 and L4 in FIG. 13B. Specifically, if the model parameters are identified by the model parameter identifier 22 with respect to the controlled object which has low-pass characteristics (characteristics of attenuating high-frequency components), the identified model parameters are largely affected by the high-frequency-rejection characteristics so that the gain of the controlled object model becomes lower than the actual characteristics in a low-frequency range. As a result, the sliding mode controller 21 excessively corrects the control input.

By changing the frequency characteristics of the weighting of the identifying algorithm to the characteristics indicated by the broken line L2 in FIG. 13A according to the low-pass filtering, the frequency characteristics of the controlled object are changed to frequency characteristics indicated by the broken line L5 in FIG. 13B. As a result, the frequency characteristics of the controlled object model is made to coincide with the actual frequency characteristics, or the low frequency gain of the controlled object model is corrected to a level which is slightly higher than the actual gain. Accordinly, it is possible to prevent the control input from being excessively corrected by the sliding mode controller 21, to thereby improve the robustness of the control system and further stabilize the control system.

The low-pass filtering is carried out by storing past values ide(k−i) of the identifying error (e.g., 10 past values for i=1 through 10) in a ring buffer, multiplying the past values by weighting coefficients, and adding the products of the past values and the weighting coefficients.

Since the identifying error ide(k) is calculated from the equations (17), (18), and (19), the same effect as described above can be obtained by performing the same low-pass filtering on the throttle valve opening deviation amount DTH(k) and the estimated throttle valve opening deviation amount DTHHAT(k), or by performing the same low-pass filtering on the throttle valve opening deviation amounts DTH(k−1), DTH(k−2) and the duty ratio DUT(k−d−1).

Figure 14:
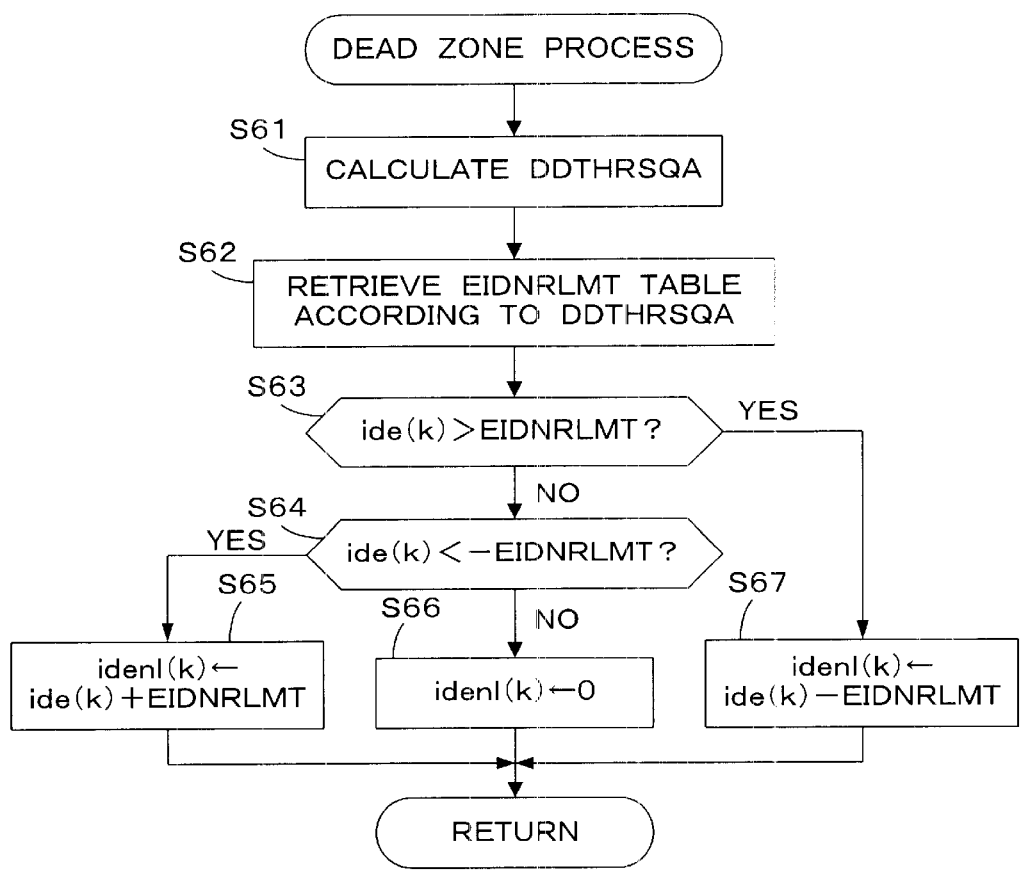
FIG. 14 is a flowchart showing the dead zone process in the process shown in FIG. 12.
Figure 15:
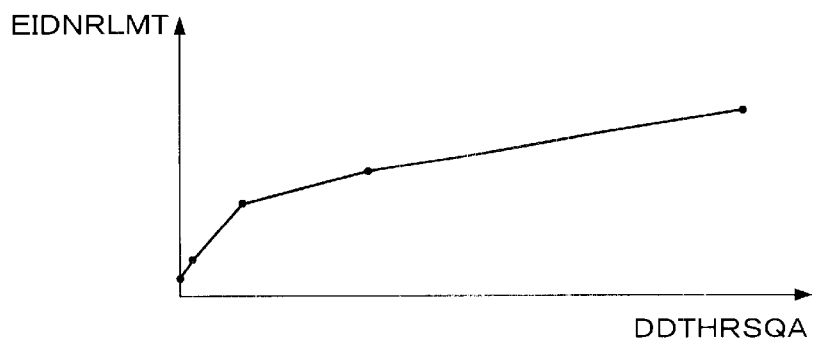
FIG. 15 is a diagram showing a table used in the process shown in FIG. 14.

Referring back to FIG. 12, the dead zone process as shown in FIG. 14 is carried out in step S56. In step S61 shown in FIG. 14, "n" in the equation (24) is set, for example, to "5" to calculate the square average value DDTHRSQA of an amount of change of the target throttle valve opening THR. Then, an EIDNRLMT table shown in FIG. 15 is retrieved according to the square average value DDTHRSQA to calculate the dead zone width parameter EIDNRLMT (step S62).

In step S63, it is determined whether or not the identifying error ide(k) is greater than the dead zone width parameter EIDNRLMT. If ide(k) is greater than EIDNRLMT, the corrected identifying error idenl(k) is calculated from the following equation (43) in step S67.

$$idenl(k)=ide(k)-EIDNRLMT \qquad (43)$$

If the answer to step S63 is negative (NO), it is determined whether or not the identifying error ide(k) is greater than the negative value of the dead zone width parameter EIDNRLMT with a minus sign (step S64).

If ide(k) is less than −EIDNRLMT, the corrected identifying error idenl(k) is calculated from the following equation (44) in step S65.

$$idenl(k)=ide(k)+EIDNRLMT \qquad (44)$$

If the identifying error ide(k) is in the range between +EIDNRLMT and −EIDNRLMT, the corrected identifying error idenl(k) is set to "0" in step S66.

Figure 16:
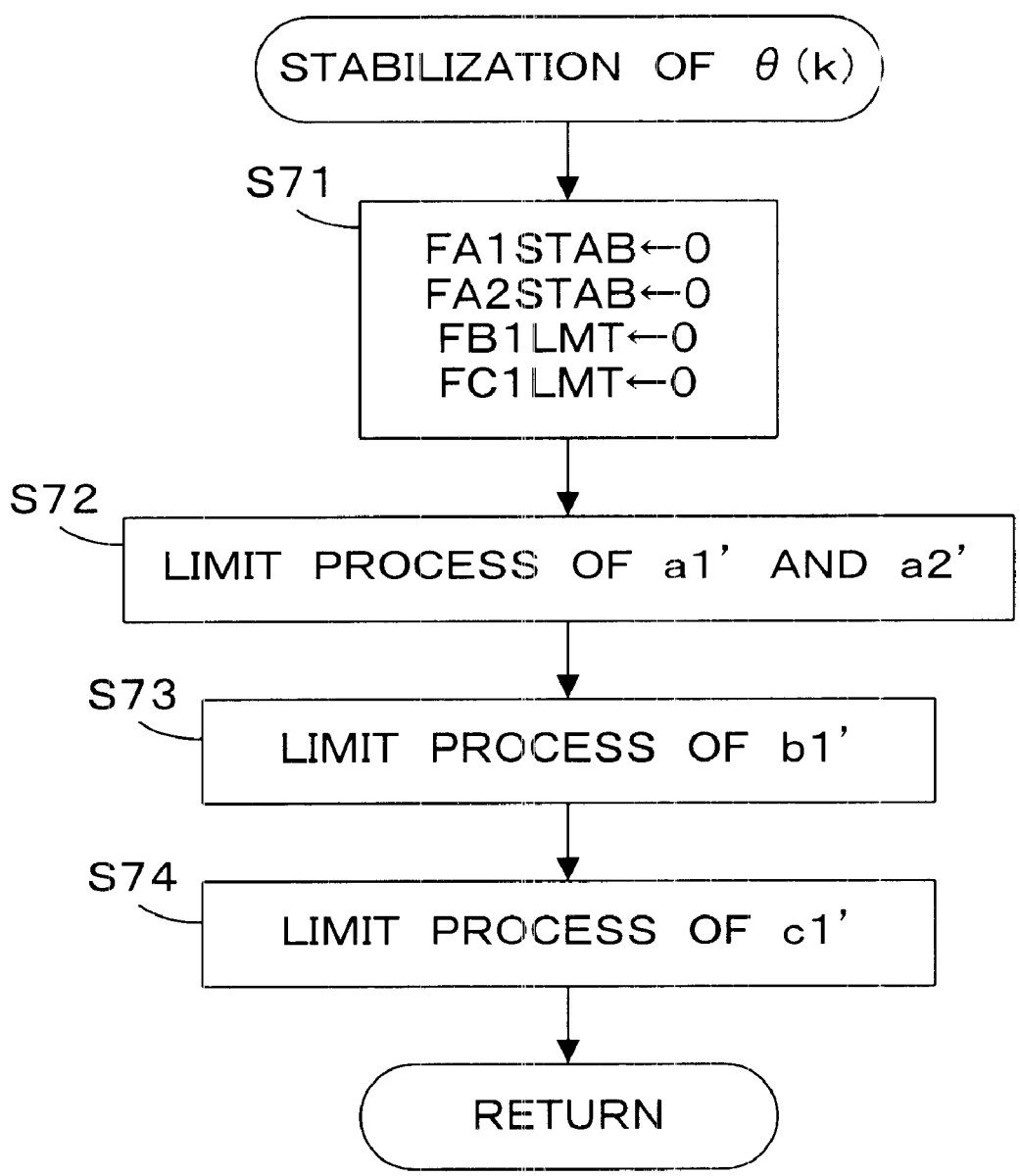
FIG. 16 is a flowchart showing a process of stabilizing a model parameter vector (θ) in the process shown in FIG. 11.

FIG. 16 is a flowchart showing a process of stabilizing the model parameter vector θ(k), which is carried out in step S35 shown in FIG. 11.

Figure 17:
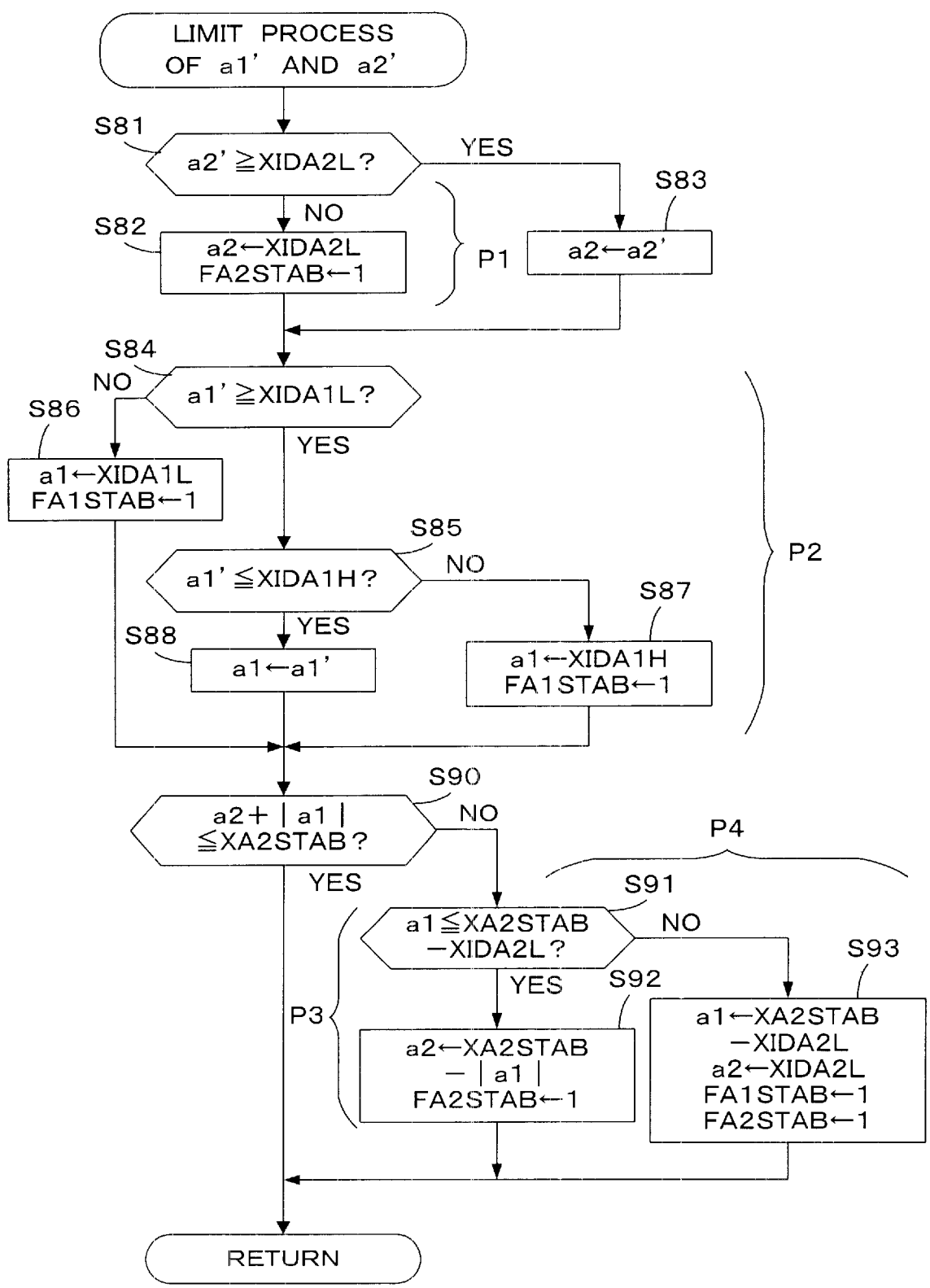
FIG. 17 is a flowchart showing a limit process of model parameters (a1', a2') in the process shown in FIG. 16.
Figure 19:
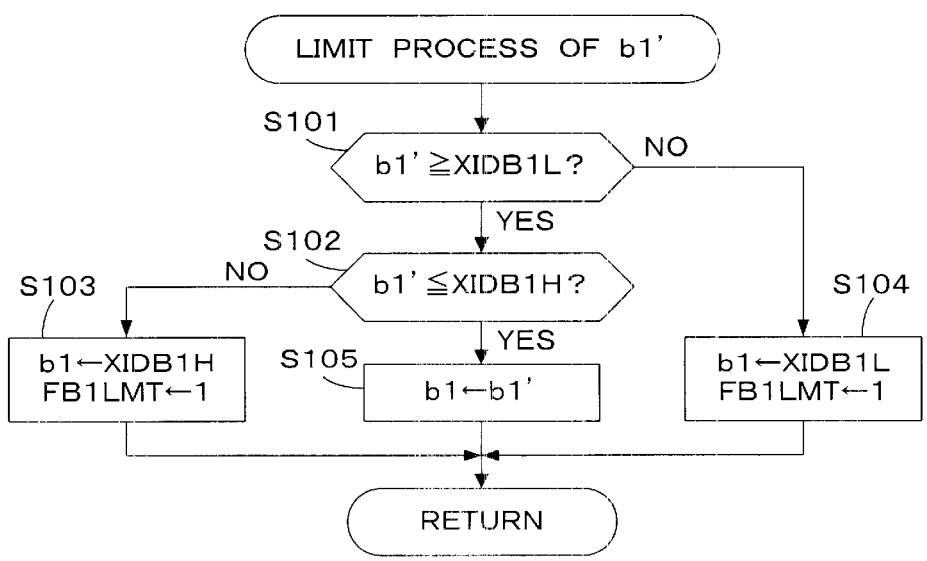
FIG. 19 is a flowchart showing a limit process of a model parameter (b1') in the process shown in FIG. 16.
Figure 20:
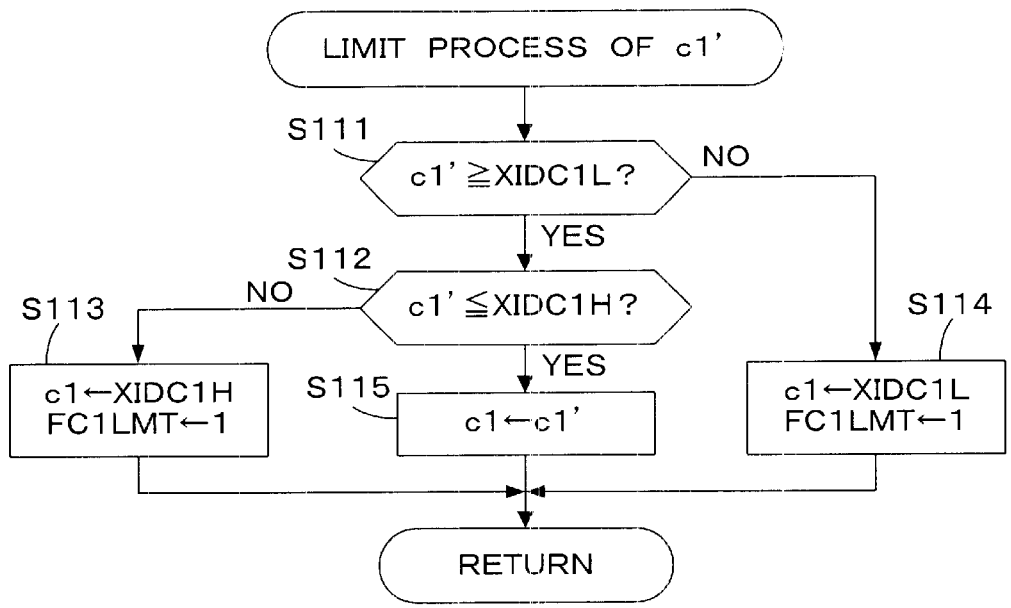
FIG. 20 is a flowchart showing a limit process of a model parameter (c1') in the process shown in FIG. 16.

In step S71 shown in FIG. 16, flags FA1STAB, FA2STAB, FB1LMT, and FC1LMT used in this process are initialized to be set to "0". In step S72, the limit process of the model parameters a1' and a2' shown in FIG. 17 is executed. In step S73, the limit process of the model parameter b1' shown in FIG. 19 is executed. In step S74, the limit process of the model parameter c1' shown in FIG. 20 is executed.

Figure 18:
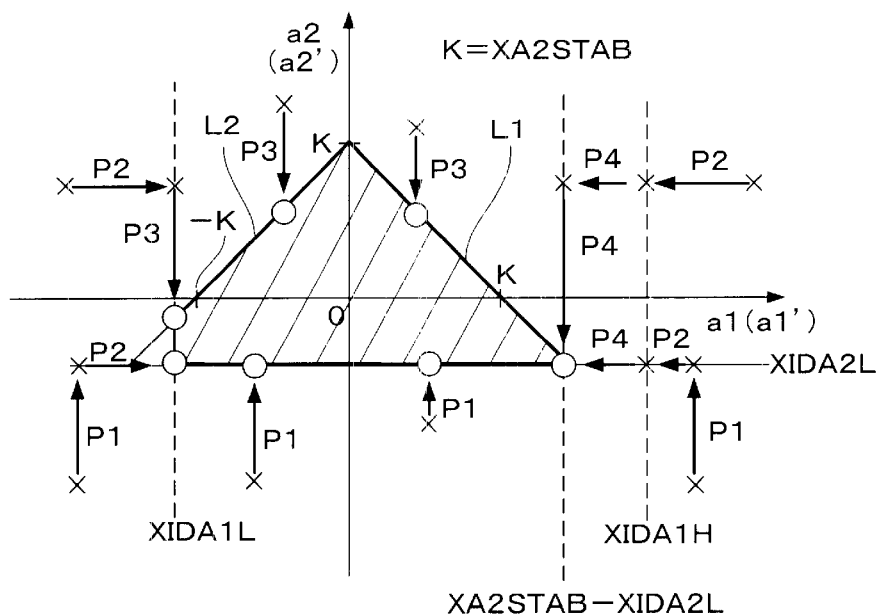
FIG. 18 is a diagram illustrative of the change in the values of the model parameters in the process shown in FIG. 16.

FIG. 17 is a flowchart showing the limit process of the model parameters a1' and a2', which is carried out in the step S72 shown in FIG. 16. FIG. 18 is a diagram illustrative of the process shown in FIG. 17, and will be referred to with FIG. 17.

In FIG. 18, combinations of the model parameters a1' and a2' which are required to be limited are indicated by "x" symbols, and the range of combinations of the model parameters a1' and a2' which are stable are indicated by a hatched region (hereinafter referred to as "stable region"). The limit process shown in FIG. 17 is a process of moving the combinations of the model parameters a1' and a2' which are in the outside of the stable region into the stable region at positions indicated by "○" symbols.

In step S81, it is determined whether or not the model parameter a2' is greater than or equal to a predetermined a2 lower limit value XIDA2L. The predetermined a2 lower limit value XIDA2L is set to a negative value greater than "−1". Stable corrected model parameters a1 and a2 are obtained when setting the predetermined a2 lower limit value XIDA2L to "−1". However, the predetermined a2 lower limit value XIDA2L is set to a negative value greater than "−1" because the matrix A defined by the equation (26) to the "n"th power may occasionally become unstable (which means that the model parameters a1' and a2' do not diverge, but oscillate).

If a2' is less than XIDA2L in step S81, the corrected model parameter a2 is set to the lower limit value XIDA2L, and an a2 stabilizing flag FA2STAB is set to "1". When the a2 stabilizing flag FA2STAB is set to "1", this indicates that the corrected model parameter a2 is set to the lower limit value XIDA2L. In FIG. 18, the correction of the model parameter in a limit process P1 of steps S81 and S82 is indicated by the arrow lines with "P1".

If the answer to the step S81 is affirmative (YES), i.e., if a2' is greater than or equal to XIDA2L, the corrected model parameter a2 is set to the model parameter a2' in step S83.

In steps S84 and S85, it is determined whether or not the model parameter a1' is in a range defined by a predetermined a1 lower limit value XIDA1L and a predetermined a1 upper limit value XIDA1H. The predetermined a1 lower limit value XIDA1L is set to a value which is equal to or greater than "−2" and lower than "0", and the predetermined a1 upper limit value XIDA1H is set to "2", for example.

If the answers to steps S84 and S85 are affirmative (YES), i.e., if a1' is greater than or equal to XIDA1L and less than or equal to XIDA1H, the corrected model parameter a1 is set to the model parameter a1' in step S88.

If a1' is less than XIDA1L in step S84, the corrected model parameter a1 is set to the lower limit value XIDA1L and an a1 stabilizing flag FA1STAB is set to "1" in step S86. If a1' is greater than XIDA1H in step S85, the corrected model parameter a1 is set to the upper limit value XIDA1H and the a1 stabilizing flag FA1STAB is set to "1" in step S87. When the a1 stabilizing flag FA1STAB is set to "1", this indicates that the corrected model parameter a1 is set to the lower limit value XIDA1L or the upper limit value XIDA1H. In FIG. 18, the correction of the model parameter in a limit process P2 of steps S84 through S87 is indicated by the arrow lines with "P2".

In step S90, it is determined whether or not the sum of the absolute value of the corrected model parameter a1 and the corrected model parameter a2 is less than or equal to a predetermined stability determination value XA2STAB. The predetermined stability determination value XA2STAB is set to a value close to "1" but less than "1" (e.g., "0.99").

Straight lines L1 and L2 shown in FIG. 18 satisfy the following equation (45).

$$a2+|a1|=XA2STAB \qquad (45)$$

Therefore, in step S90, it is determined whether or not the combination of the corrected model parameters a1 and a2 is placed at a position on or lower than the straight lines L1 and L2 shown in FIG. 18. If the answer to step S90 is affirmative (YES), the limit process immediately ends, since the combination of the corrected model parameters a1 and a2 is in the stable region shown in FIG. 18.

If the answer to step S90 is negative (NO), it is determined whether or not the corrected model parameter a1 is less than or equal to a value obtained by subtracting the predetermined a2 lower limit value XIDA2L from the predetermined stability determination value XA2STAB in step S91 (since XIDA2L is less than "0", XA2STAB−XIDA2L is greater than XA2STAB). If the corrected model parameter a1 is equal to or less than (XA2STAB−XIDA2L), the corrected model parameter a2 is set to (XA2STAB−|a1|) and the a2 stabilizing flag FA2STAB is set to "1" in step S92.

If the corrected model parameter a1 is greater than (XA2STAB−XIDA2L) in step S91, the corrected model parameter a1 is set to (XA2STAB−XIDA2L) in step S93. Further in step S93, the corrected model parameter a2 is set to the predetermined a2 lower limit value XIDA2L, and the a1 stabilizing flag FA1STAB and the a2 stabilizing flag FA2STAB are set to "1" in step S93.

In FIG. 18, the correction of the model parameter in a limit process P3 of steps S91 and S92 is indicated by the arrow lines with "P3", and the correction of the model parameter in a limit processP4 in steps S91 and S93 is indicated by the arrow lines with "P4".

As described above, the limit process shown in FIG. 17 is carried out to bring the model parameters a1' and a2' into the stable region shown in FIG. 18, thus calculating the corrected model parameters a1 and a2.

FIG. 19 is a flowchart showing a limit process of the model parameter b1', which is carried out in step S73 shown in FIG. 16.

In steps S101 and S102, it is determined whether or not the model parameter b1' is in a range defined by a predetermined b1 lower limit value XIDB1L and a predetermined b1 upper limit value XIDB1H. The predetermined b1 lower limit value XIDB1L is set to a positive value (e.g., "0.1"), and the predetermined b1 upper limit value XIDB1H is set to "1", for example.

If the answers to steps S101 and S102 are affirmative (YES), i.e., if b1' is greater than or equal to XIDB1L and less than or equal to XIDB1H, the corrected model parameter b1 is set to the model parameter b1' in step S105.

If b1' is less than XIDB1L in step S101, the corrected model parameter b1 is set to the lower limit value XIDB1L, and a b1 limiting flag FB1LMT is set to "1" in step S104. If b1' is greater than XIDB1H in step S102, then the corrected model parameter b1 is set to the upper limit value XIDB1H, and the b1 limiting flag FB1LMT is set to "1" in step S103. When the b1 limiting flag FB1LMT is set to "1", this indicates that the corrected model parameter b1 is set to the lower limit value XIDB1L or the upper limit value XIDB1H.

FIG. 20 is a flowchart showing a limit process of the model parameter c1', which is carried out in step S74 shown in FIG. 16.

In steps S111 and S112, it is determined whether or not the model parameters c1' is in a range defined by a predetermined c1 lower limit value XIDC1L and a predetermined c1 upper limit value XIDC1H. The predetermined c1 lower limit value XIDC1L is set to "−60", for example, and the predetermined c1 upper limit value XIDC1H is set to "60", for example.

If the answers to steps S111 and S112 are affirmative (YES), i.e., if c1' is greater than or equal to XIDC1L and less than or equal to XIDC1H, the corrected model parameter c1 is set to the model parameter c1' in step S115.

If c1' is less than XIDC1L in step S111, the corrected model parameter c1 is set to the lower limit value XIDC1L, and a c1 limiting flag FC1LMT is set to "1" in step S114. If c1' is greater than XIDC1H in step S112, the corrected model parameter c1 is set to the upper limit value XIDC1H, and the c1 limiting flag FC1LMT is set to "1" in step S113. When the c1 limiting flag FC1LMT is set to "1", this indicates that the corrected model parameter c1 is set to the lower limit value XIDC1L or the upper limit value XIDC1H.

FIG. 21 is a flowchart showing a process of calculations of the state predictor, which is carried out in step S13 shown in FIG. 9.

In step S121, the matrix calculations are executed to calculate the matrix elements α1, α2, β1, β2, γ1 through γd in the equation (35).

In step S122, the predicted deviation amount PREDTH(k) is calculated from the equation (35).

FIG. 22 is a flowchart showing a process of calculation of the control input Usl (=DUT) applied to the throttle valve actuating device 10, which is carried out in step S14 shown in FIG. 9.

Figure 23:
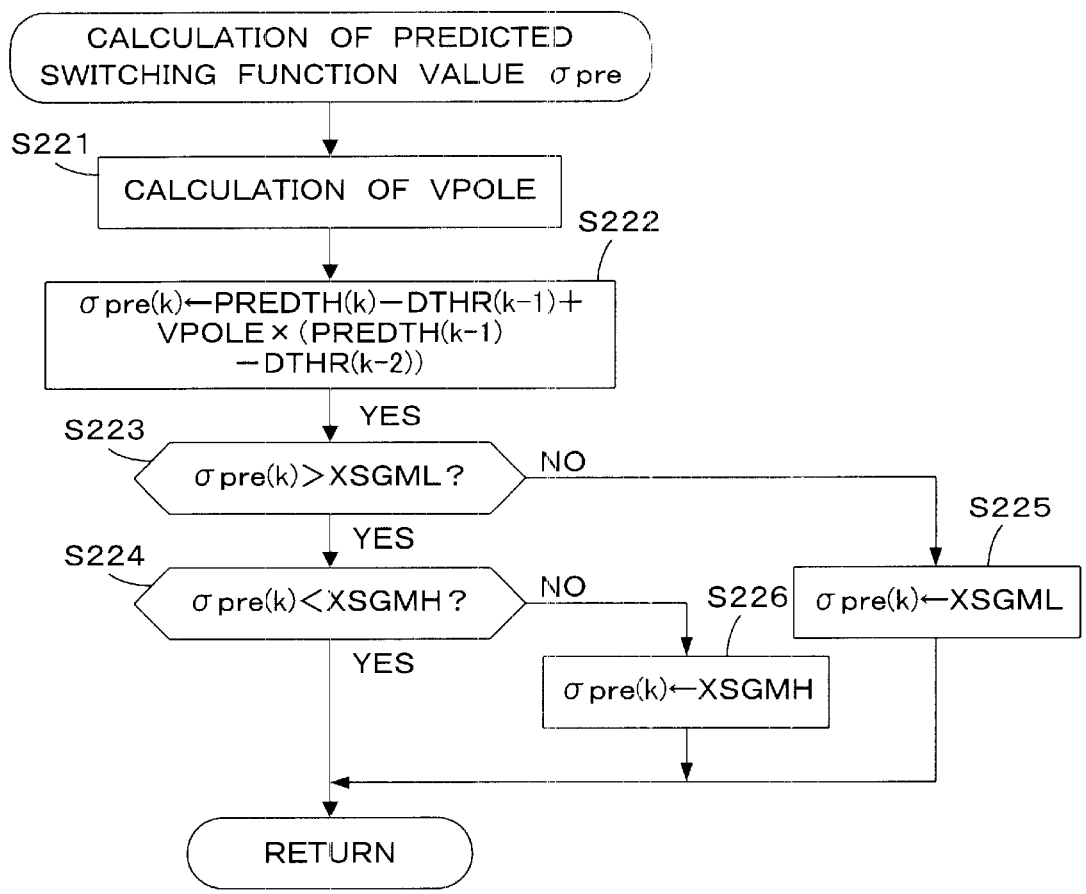
FIG. 23 is a flowchart showing a process of calculating a predicted switching function value (σpre) in the process shown in FIG. 22.
Figure 26:
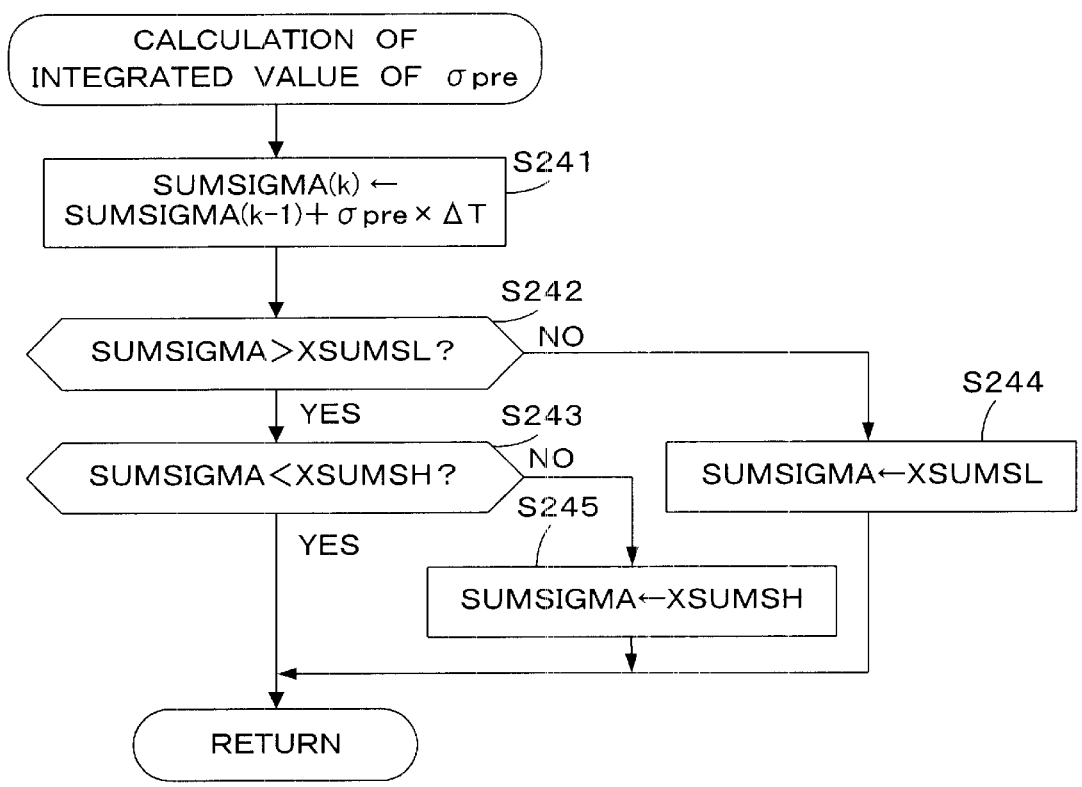
FIG. 26 is a flowchart showing a process of calculating an integrated value of the predicted switching function value (σpre) in the process shown in FIG. 22.
Figure 27:
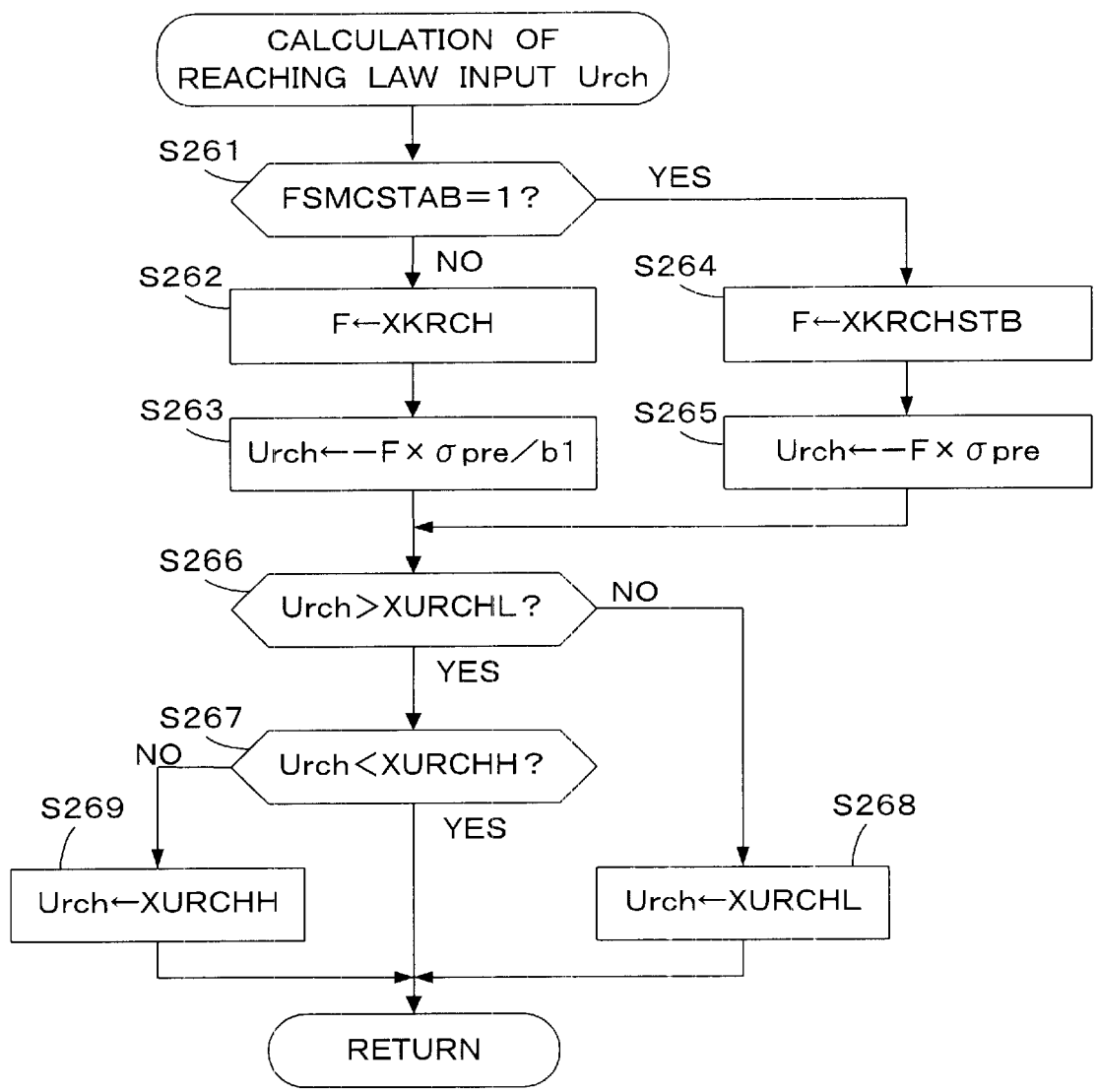
FIG. 27 is a flowchart showing a process of calculating a reaching law input (Urch) in the process shown in FIG. 22.
Figure 28:
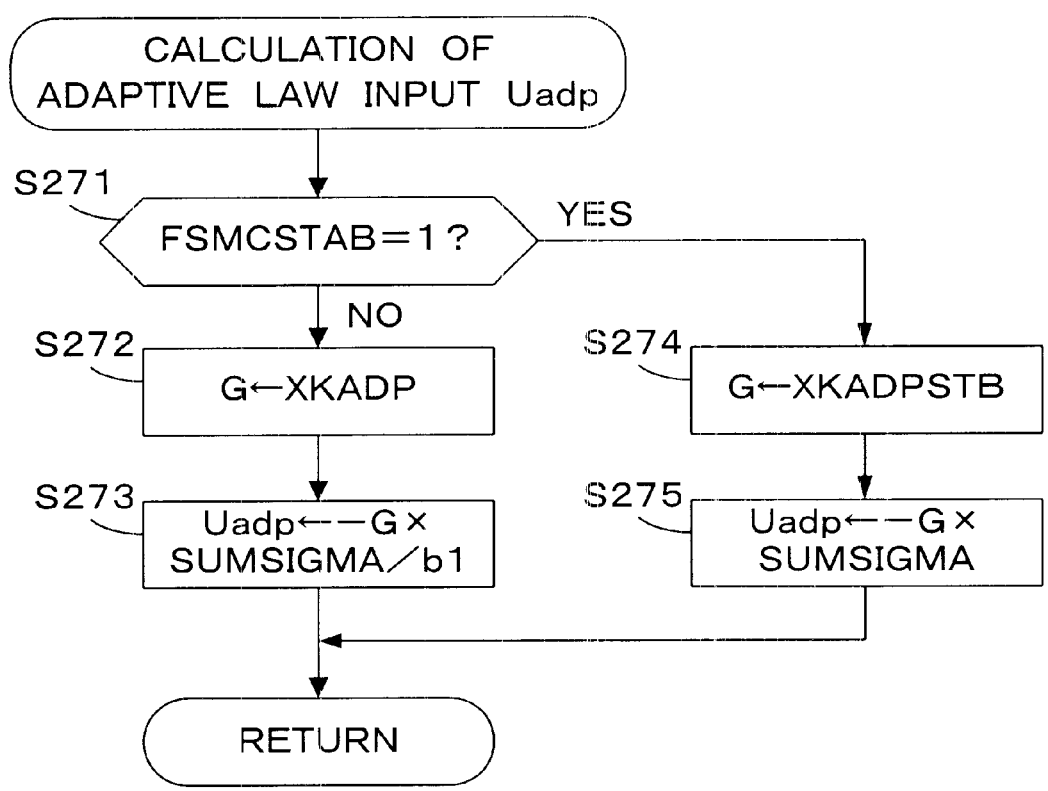
FIG. 28 is a flowchart showing a process of calculating an adaptive law input (Uadp) in the process shown in FIG. 22.

In step S201, a process of calculation of the predicted switching function value σpre, which is shown in FIG. 23, is executed. In step S202, a process of calculation of the integrated value of the predicted switching function value σpre, which is shown in FIG. 26, is executed. In step S203, the equivalent control input Ueq is calculated from the equation (9). In step S204, a process of calculation of the reaching law input Urch, which is shown in FIG. 27, is executed. In step S205, a process of calculation of the adaptive law input Uadp, which is shown in FIG. 28, is executed.

In step S206, it is determined whether or not the stability determination flag FSMCSTAB set in the process shown in FIG. 29 is "1". When the stability determination flag FSMC-STAB is set to "1", this indicates that the adaptive sliding mode controller 21 is unstable.

If FSMCSTAB is "0" in step S206, indicating that the adaptive sliding mode controller 21 is stable, the control inputs Ueq, Urch, and Uadp which are calculated in steps S203 through S205 are added, thereby calculating the control input Usl in step S207.

If FSMCSTAB is "1" in step S206, indicating that the adaptive sliding mode controller 21 is unstable, the sum of the reaching law input Urch and the adaptive law input Uadp is calculated as the control input Usl. In other words, the equivalent control input Ueq is not used for calculating the control input Usl, thus preventing the control system from becoming unstable.

In steps S209 and S210, it is determined whether or not the calculated control input Usl is in a range defined between a predetermined upper limit value XUSLH and a predetermined lower limit value XUSLL. If the control input Usl is in the range between XUSLH and XUSLL, the process immediately ends. If the control input Usl is less than or equal to the predetermined lower limit value XUSLL in step S209, the control input Usl is set to the predetermined lower limit value XUSLL in step S212. If the control input Usl is greater than or equal to the predetermined upper limit value XUSLH in step S210, the control input Usl is set to the predetermined upper limit value XUSLH in step S211.

FIG. 23 is a flowchart showing a process of calculating the predicted switching function value σpre, which is carried out in step S201 shown in FIG. 22.

Figure 24:
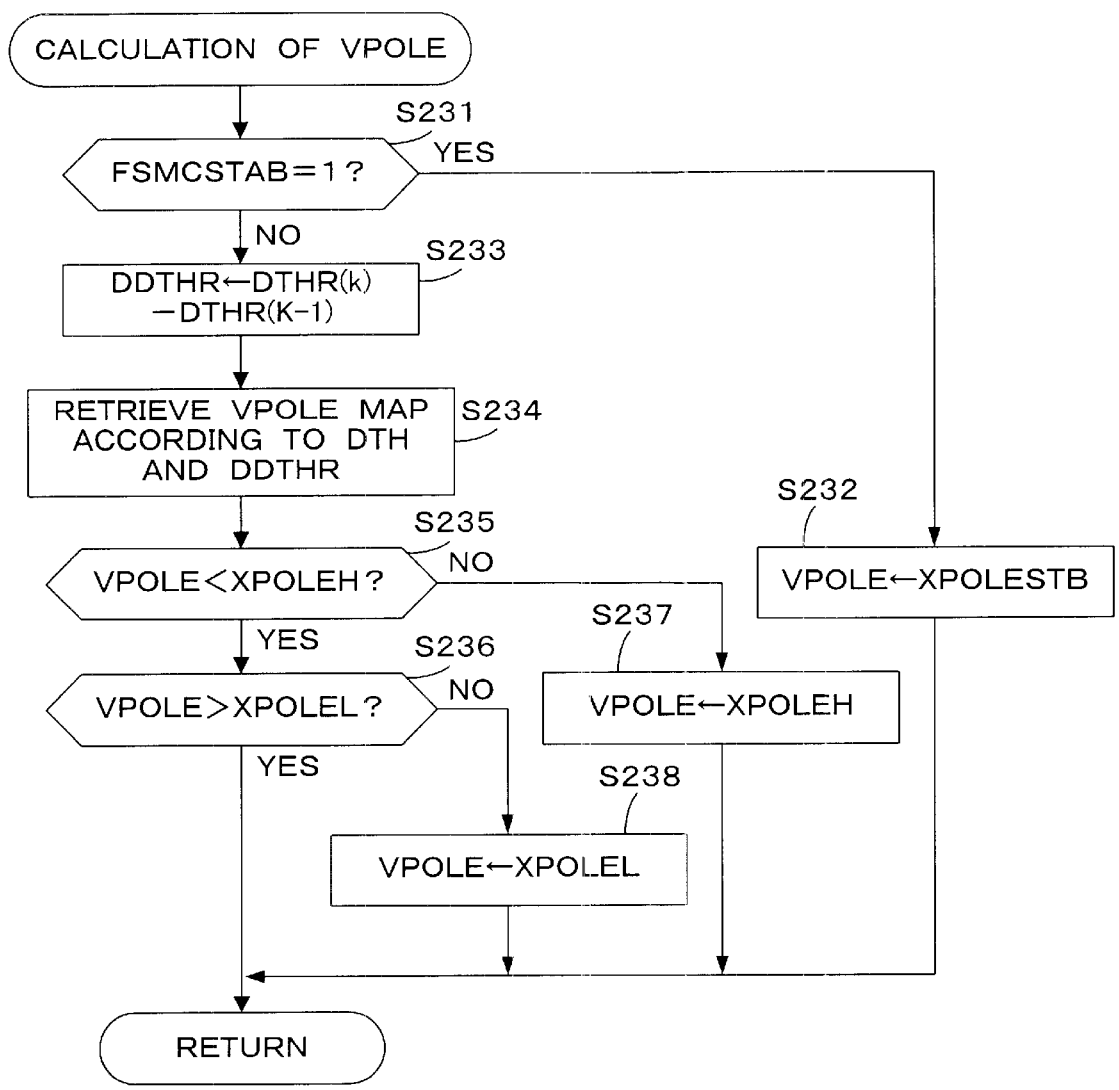
FIG. 24 is a flowchart showing a process of calculating the switching function setting parameter (VPOLE) in the process shown in FIG. 23.

In step S221, the process of calculating the switching function setting parameter VPOLE, which is shown in FIG. 24 is executed. Then, the predicted switching function value σpre(k) is calculated from the equation (36) in step S222.

In steps S223 and S224, it is determined whether or not the calculated predicted switching function value σpre(k) is in a range defined between a predetermined upper value XSGMH and a predetermined lower limit value XSGML. If the calculated predicted switching function value σpre(k) is in the range between XSGMH and XSGML, the process shown in FIG. 23 immediately ends. If the calculated predicted switching function value σpre(k) is less than or equal to the predetermined lower limit value XSGML in step S223, the calculated predicted switching function value σpre(k) is set to the predetermined lower limit value XSGML in step S225. If the calculated predicted switching function value σpre(k) is greater than or equal to the predetermined upper limit value XSGMH in step S224, the calculated predicted switching function value σpre(k) is set to the predetermined upper limit value XSGMH in step S226.

FIG. 24 is a flowchart showing a process of calculating the switching function setting parameter VPOLE, which is carried out in step S221 shown in FIG. 23.

In step S231, it is determined whether or not the stability determination flag FSMCSTAB is "1". If FSMCSTAB is "1" in step S231, indicating that the adaptive sliding mode controller 21 is unstable, the switching function setting parameter VPOLE is set to a predetermined stabilizing value XPOLESTB in step S232. The predetermined stabilizing value XPOLESTB is set to a value which is greater than "−1" but very close to "−1" (e.g., "−0.999").

If FSMCSTAB is "0", indicating that the adaptive sliding mode controller 21 is stable, an amount of change DDTHR(k) in the target value DTHR(k) is calculated from the following equation (46) in step S233.

$$DDTHR(k)=DTHR(k)-DTHR(k-1) \quad (46)$$

Figure 25A:
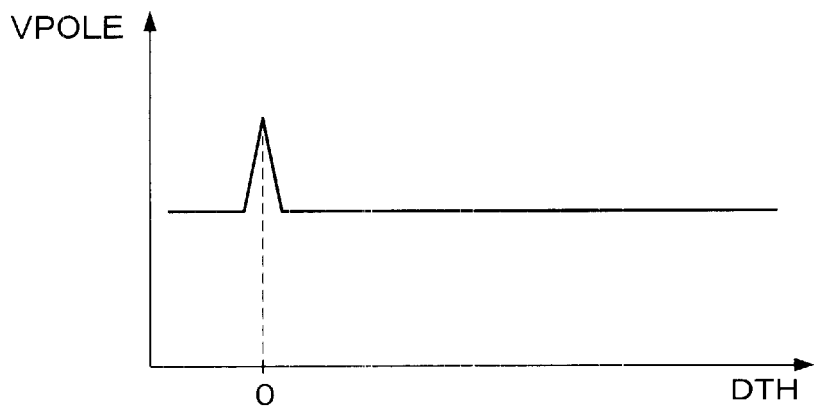
FIGS. 25A through 25C are diagrams showing maps used in the process shown in FIG. 24.
Figure 25B:
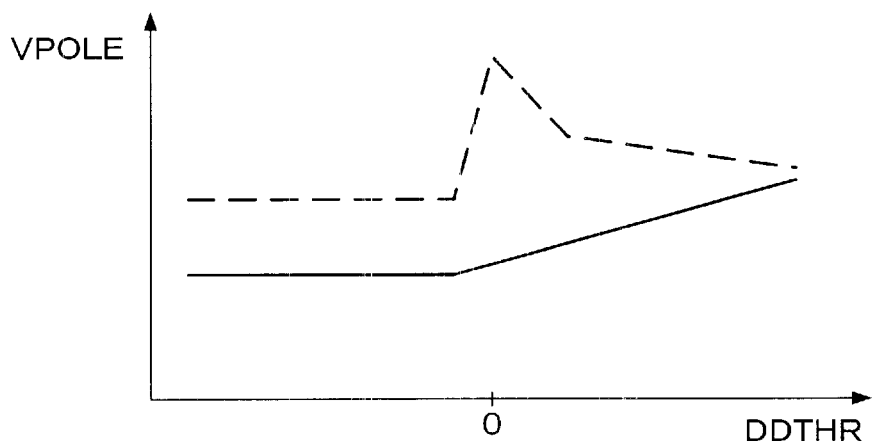

In step S234, a VPOLE map is retrieved according to the throttle valve opening deviation amount DTH and the amount of change DDTHR calculated in step S233 to calculate the switching function setting parameter VPOLE. As shown in FIG. 25A, the VPOLE map is set so that the switching function setting parameter VPOLE increases when the throttle valve opening deviation amount DTH has a value in the vicinity of "0", i.e., when the throttle valve opening TH is in the vicinity of the default opening THDEF, and the switching function setting parameter VPOLE has a substantially constant value regardless of changes of the throttle valve opening deviation amount DTH, when the throttle valve opening deviation amount DTH has values which are not in the vicinity of "0". The VPOLE map is also set so that the switching function setting parameter VPOLE increases as the amount of change DDTHR in target value increases as indicated by the solid line in FIG. 25B, and the switching function setting parameter VPOLE increases as the amount of change DDTHR in the target value has a value in the vicinity of "0" as indicated by the broken line in FIG. 25B, when the throttle valve opening deviation amount DTH has a value in the vicinity of "0".

Specifically, when the target value DTHR for the throttle valve opening changes greatly in the decreasing direction, the switching function setting parameter VPOLE is set to a relatively small value. This makes it possible to prevent the throttle valve 3 from colliding with the stopper for stopping the throttle valve 3 in the fully closed position. In the vicinity of the default opening THDEF, the switching function setting parameter VPOLE is set to a relatively large value, which improves the controllability in the vicinity of the default opening THDEF.

Figure 25C:
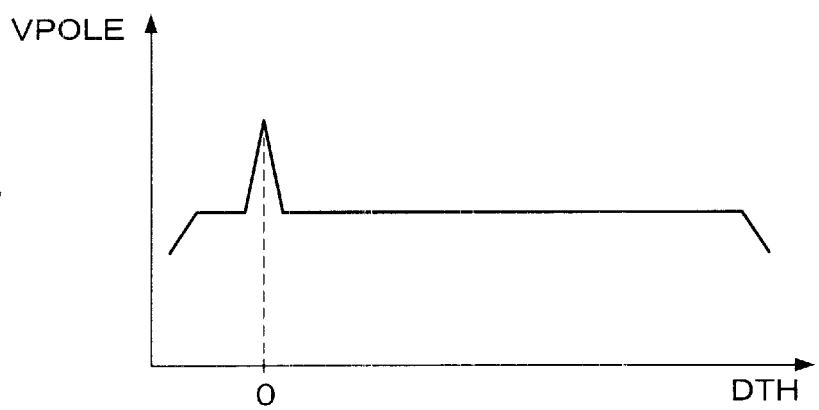

As shown in FIG. 25C, the VPOLE map may be set so that the switching function setting parameter VPOLE decreases when the throttle valve opening TH is in the vicinity of the fully closed opening or the fully open opening. Therefore, when the throttle valve opening TH is in the vicinity of the fully closed opening or the fully open opening, the speed for the throttle valve opening TH to follow up the target opening THR is reduced. As a result, collision of the throttle valve 3 with the stopper can more positively be avoided (the stopper also stops the throttle valve 3 in the fully open position).

In steps S235 and S236, it is determined whether or not the calculated switching function setting parameter VPOLE is in a range defined between a predetermined upper limit value XPOLEH and a predetermined lower limit XPOLEL. If the switching function setting parameter VPOLE is in the range between XPOLEH and XPOLEL, the process shown immediately ends. If the switching function setting parameter VPOLE is less than or equal to the predetermined lower limit value XPOLEL in step S236, the switching function setting parameter VPOLE is set to the predetermined lower limit value XPOLEL in step S238. If the switching function setting parameter VPOLE is greater than or equal to the predetermined upper limit value XPOLEH in step S235, the switching function setting parameter VPOLE is set to the predetermined upper limit value XPOLEH in step S237.

FIG. 26 is a flowchart showing a process of calculating an integrated value of σpre, SUMSIGMA, of the predicted switching function value σpre. This process is carried out in step S202 shown in FIG. 22. The integrated value SUMSIGMA is used for calculating the adaptive law input Uadp in the process shown in FIG. 28 which will be described later (see the equation (11a)).

In step S241, the integrated value SUMSIGMA is calculated from the following equation (47) where ΔT represents a calculation period.

$$SUMSIGMA(k) = SUMSIGMA(k-1) + \sigma pre \times \Delta T \qquad (47)$$

In steps S242 and S243, it is determined whether or not the calculated integrated value SUMSIGMA is in a range defined between a predetermined upper limit value XSUMSH and a predetermined lower limit value XSUMSL. If the integrated value SUMSIGMA is in the range between XSUMSH and XSUMSL, the process immediately ends. If the integrated value SUMSIGMA is less than or equal to the predetermined lower limit value XSUMSL in step S242, the integrated value SUMSIGMA is set to the predetermined lower limit value XSUMSL in step S244. If the integrated value SUMSIGMA is greater than or equal to the predetermined upper limit value XSUMSH in step S243, the integrated value SUMSIGMA is set to the predetermined upper limit value XSUMSH in step S245.

FIG. 27 is a flowchart showing a process of calculating the reaching law input Urch, which is carried out in step S204 shown in FIG. 22.

In step S261, it is determined whether or not the stability determination flag FSMCSTAB is "1". If the stability determination flag FSMCSTAB is "0", indicating that the adaptive sliding mode controller 21 is stable, the control gain F is set to a normal gain XKRCH in step S262, and the reaching law input Urch is calculated from the following equation (48), which is the same as the equation (10a), in step S263.

$$Urch = -F \times \sigma pre / b1 \qquad (48)$$

If the stability determination flag FSMCSTAB is "1", indicating that the adaptive sliding mode controller 21 is unstable, the control gain F is set to a predetermined stabilizing gain XKRCHSTB in step S264, and the reaching law input Urch is calculated according to the following equation (49), which does not include the model parameter b1, in step S265.

$$Urch = -F \times \sigma pre \qquad (49)$$

In steps S266 and S267, it is determined whether the calculated reaching law input Urch is in a range defined between a predetermined upper limit value XURCHH and a predetermined lower limit value XURCHL. If the reaching law input Urch is in the range between XURCHH and XURCHL, the process immediately ends. If the reaching law input Urch is less than or equal to the predetermined lower limit value XURCHL in step S266, the reaching law input Urch is set to the predetermined lower limit value XURCHL in step S268. If the reaching law input Urch is greater than or equal to the predetermined upper limit value XURCHH in step S267, the reaching law input Urch is set to the predetermined upper limit value XURCHH in step S269.

As described above, when the adaptive sliding mode controller 21 becomes unstable, the control gain F is set to the predetermined stabilizing gain XKRCHSTB, and the reaching law input Urch is calculated without using the model parameter b1, which brings the adaptive sliding mode controller 21 back to its stable state. When the identifying process carried out by the model parameter identifier 22 becomes unstable, the adaptive sliding mode controller 21 becomes unstable. Therefore, by using the equation (49) that does not include the model parameter b1 which has become unstable, the adaptive sliding mode controller 21 can be stabilized.

FIG. 28 is a flowchart showing a process of calculating the adaptive law input Uadp, which is carried out in step S205 shown in FIG. 22.

In step S271, it is determined whether or not the stability determination flag FSMCSTAB is "1". If the stability determination flag FSMCSTAB is "0", indicating that the adaptive sliding mode controller 21 is stable, the control gain G is set to a normal gain XKADP in step S272, and the adaptive law input Uadp is calculated from the following equation (50), which corresponds to the equation (11a), in step S273.

$$Uadp = -G \times SUMSIGMA / b1 \qquad (50)$$

If the stability determination flag FSMCSTAB is "1", indicating that the adaptive sliding mode controller 21 is unstable, the control gain G is set to a predetermined stabilizing gain XKADPSTB in step S274, and the adaptive law input Uadp is calculated according to the following equation (51), which does not include the model parameter b1, in step S275.

$$Uadp = -G \times SUMSIGMA \qquad (51)$$

As described above, when the adaptive sliding mode controller 21 becomes unstable, the control gain G is set to the predetermined stabilizing gain XKADPSTB, and the adaptive law input Uadp is calculated without using the model parameter b1, which brings the adaptive sliding mode controller 21 back to its stable state.

FIG. 29 is a flowchart showing a process of determining the stability of the sliding mode controller, which is carried out in step S16 shown in FIG. 9. In this process, the stability is determined based on a differential value of the Lyapunov function, and the stability determination flag FSMCSTAB is set according to the result of the stability determination.

In step S281, a switching function change amount Dσpre is calculated from the following equation (52). Then, a stability determining parameter SGMSTAB is calculated from the following equation (53) in step S282.

$$D\sigma pre = \sigma pre(k) - \sigma pre(k-1) \qquad (52)$$

$$SGMSTAB = D\sigma pre \times \sigma pre(k) \qquad (53)$$

In step S283, it is determined whether or not the stability determination parameter SGMSTAB is less than or equal to a stability determining threshold XSGMSTAB. If SGMSTAB is greater than XSGMSTAB, it is determined that the adaptive sliding mode controller 21 may possibly be unstable, and an unstability detecting counter CNTSMCST is incremented by "1" in step S285. If SGMSTAB is less than or equal to XSGMSTAB, the adaptive sliding mode controller 21 is determined to be stable, and the count of the unstability detecting counter CNTSMCST is not incremented but maintained in step S284.

In step S286, it is determined whether or not the value of the unstability detecting counter CNTSMCST is less than or equal to a predetermined count XSSTAB. If CNTSMCST is less than or equal to XSSTAB, the adaptive sliding mode controller 21 is determined to be stable, and a first determination flag FSMCSTAB1 is set to "0" in step S287. If CNTSMCST is greater than XSSTAB, the adaptive sliding mode controller 21 is determined to be unstable, and the first determination flag FSMCSTAB1 is set to "1" in step S288. The value of the unstability detecting counter CNTSMCST is initialized to "0", when the ignition switch is turned on.

In step S289, a stability determining period counter CNTJUDST is decremented by "1". It is determined whether or not the value of the stability determining period counter CNTJUDST is "0" in step S290. The value of the stability determining period counter CNTJUDST is initialized to a predetermined determining count XCJUDST, when the ignition switch is turned on. Initially, therefore, the answer to step S290 is negative (NO), and the process immediately goes to step S295.

If the count of the stability determining period counter CNTJUDST subsequently becomes "0", the process goes from step S290 to step S291, in which it is determined whether or not the first determination flag FSMCSTAB1 is "1". If the first determination flag FSMCSTAB1 is "0", a second determination flag FSMCSTAB2 is set to "0" in step S293. If the first determination flag FSMCSTAB1 is "1", the second determination flag FSMCSTAB2 is set to "1" in step S292.

In step S294, the value of the stability determining period counter CNTJUDST is set to the predetermined determining count XCJUDST, and the unstability detecting counter CNTSMCST is set to "0". Thereafter, the process goes to step S295.

In step S295, the stability determination flag FSMCSTAB is set to the logical sum of the first determination flag FSMCSTAB1 and the second determination flag FSMCSTAB2. The second determination flag FSMCSTAB2 is maintained at "1" until the value of the stability determining period counter CNTJUDST becomes "0", even if the answer to step S286 becomes affirmative (YES) and the first determination flag FSMCSTAB1 is set to "0". Therefore, the stability determination flag FSMCSTAB is also maintained at "1" until the value of the stability determining period counter CNTJUDST becomes "0".

FIG. 30 is a flowchart showing a process of calculating the default opening deviation thdefadp, which is carried out in step S17 shown in FIG. 9.

In step S251 shown FIG. 30, a gain coefficient KPTH(k) is calculated according to the following equation (54).

$$KPTH(k)=PTH(k-1)/(1+PTH(k-1)) \qquad (54)$$

where PTH(k−1) represents a gain parameter calculated in step S253 when the present process was carried out in the preceding cycle.

In step S252, the model parameter c1' calculated in the process of calculations of the model parameter identifier as shown in FIG. 11 and the gain coefficient KPTH(k) calculated in step S251 are applied to the following equation (55) to calculate a default opening deviation thdefadp(k).

$$thdefadp(k)=thdefadp(k-1)+KPTH(k) \times (c1'-thdefadp(k-1)) \qquad (55)$$

In step S253, a gain parameter PTH(k) is calculated from the following equation (56):

$$PTH(k)=\{1-PTH(k-1)/(XDEFADPW+PTH(k-1))\} \times PTH(k-1)/XDEFADPW \qquad (56)$$

The equation (56) is obtained by setting λ1' and λ2' in the equation (39) respectively to a predetermined value XDEFADP and "1".

According to the process shown in FIG. 30, the model parameter c1' is statistically processed by the sequential method-of-weighted-least-squares algorithm to calculate the default opening deviation thdefadp.

In the present embodiment, the model parameter identifier 22 shown in FIG. 3 corresponds to an identifying means, and the state predictor 23 shown in FIG. 3 corresponds to a predicting means.

Although a certain preferred embodiment of the present invention has been shown and described in detail, it should be understood that various changes and modifications may be made therein without departing from the scope of the appended claims.

What is claimed is:

1. A control system for a throttle valve actuating device including a throttle valve of an internal combustion engine and actuating means for actuating said throttle valve, said control system including,
predicting means for predicting a future throttle valve opening and controlling said throttle actuating device according to the throttle valve opening predicted by said predicting means so that the throttle valve opening coincides with a target opening, wherein said throttle valve actuating device is modeled to a controlled object model which includes a dead time element, and said predicting means predicts a throttle valve opening after the elapse of a dead time due to said dead time element, based on said controlled object model; and
identifying means for identifying at least one model parameter of said controlled object model, wherein said predicting means predicts the throttle valve opening using the at least one model parameter identified by said identifying means.

2. A control system according to claim 1, further including a sliding mode controller for controlling said throttle valve actuating device with sliding mode control according to a throttle valve opening predicted by said predicting means, and identifying means for identifying at least one model parameter of the controlled object model, wherein said sliding mode controller controls said throttle valve actuating device using the at least one model parameter identified by said identifying means.

3. A control system according to claim 1, further including a sliding mode controller for controlling said throttle valve actuating device with a sliding mode control according to a throttle valve opening predicted by said predicting means.

4. A control system according to claim 3, wherein the control input from said sliding mode controller to said throttle valve actuating device includes an adaptive law input.

5. A control method for controlling a throttle valve actuating device including a throttle valve of an internal combustion engine and an actuator for actuating said throttle valve, said control method comprising the steps of:

a) predicting a future throttle valve opening; and
b) controlling said throttle actuating device according to the predicted throttle valve opening so that the throttle valve opening coincides with a target opening, wherein said throttle valve actuating device is modeled to a controlled object model which includes a dead time element, and a throttle valve opening after the elapse of a dead time due to said dead time element, is predicted based on said controlled object model; and
c) identifying at least one model parameter of said controlled object model, wherein the throttle valve opening is predicted using the identified at least one model parameter.

6. A control method according to claim 5, further comprising the step of identifying at least one model parameter of the controlled object model, wherein said throttle valve actuating device is controlled with a sliding mode control according to the predicted throttle valve opening, using the identified at least one model parameter.

7. A control method according to claim 5, wherein said throttle valve actuating device is controlled with a sliding mode control according to the predicted throttle valve opening.

8. A control method according to claim 7, wherein the control input to said throttle valve actuating device includes an adaptive law input.

9. A control system for a throttle valve actuating device including a throttle valve of an internal combustion engine and an actuator for actuating said throttle valve, said control system including, a predictor for predicting a future throttle valve opening and controlling said throttle actuating device according to the throttle valve opening predicted by said predictor so that the throttle valve opening coincides with a target opening, wherein said throttle valve actuating device is modeled to a controlled object model which includes a dead time element, and said predictor predicts a throttle valve opening after the elapse of a dead time due to said dead time element, based on said controlled object model; and an identifier for identifying at least one model parameter of said controlled object model, wherein said predictor predicts the throttle valve opening using the at least one model parameter identified by said identifier.

10. A control system according to claim 9, further including a sliding mode controller for controlling said throttle valve actuating device with a sliding mode control according to a throttle valve opening predicted by said predictor, and an identifier for identifying at least one model parameter of the controlled object model, wherein said sliding mode controller controls said throttle valve actuating device using the at least one model parameter identified by said identifier.

11. A control system according to claim 9, further including a sliding mode controller for controlling said throttle valve actuating device with a sliding mode control according to a throttle valve opening predicted by said predictor.

12. A control system according to claim 11, wherein the control input from said sliding mode controller to said throttle valve actuating device includes an adaptive law input.

* * * * *